US011562199B2

(12) United States Patent
Fourney et al.

(10) Patent No.: US 11,562,199 B2
(45) Date of Patent: Jan. 24, 2023

(54) SYSTEM FOR INTERPRETING AND MANAGING IMPRECISE TEMPORAL EXPRESSIONS

(71) Applicant: Microsoft Technology Licensing, LLC, Redmond, WA (US)

(72) Inventors: Adam Fourney, Redmond, WA (US); Paul Nathan Bennett, Redmond, WA (US); Ryen White, Woodinville, WA (US); Eric Horvitz, Kirkland, WA (US); Xin Rong, Ann Arbor, MI (US); David Graus, Noord-Holland (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 331 days.

(21) Appl. No.: 16/897,590

(22) Filed: Jun. 10, 2020

(65) Prior Publication Data
US 2020/0302264 A1    Sep. 24, 2020

Related U.S. Application Data

(63) Continuation of application No. 15/368,314, filed on Dec. 2, 2016, now Pat. No. 10,719,757.

(51) Int. Cl.
| | |
|---|---|
| *G06N 3/00* | (2006.01) |
| *G06N 5/04* | (2006.01) |
| *G06F 3/0484* | (2022.01) |
| *G06Q 10/06* | (2012.01) |
| *G06Q 10/10* | (2012.01) |

(Continued)

(52) U.S. Cl.
CPC ........... *G06N 3/006* (2013.01); *G06F 3/0237* (2013.01); *G06F 3/0484* (2013.01); *G06F 16/3322* (2019.01); *G06F 40/00* (2020.01); *G06N 5/04* (2013.01); *G06Q 10/06311* (2013.01); *G06Q 10/109* (2013.01); *G06F 40/289* (2020.01)

(58) Field of Classification Search
CPC ...... G06N 3/006; G06N 5/04; G06F 16/3322; G06F 3/0237; G06F 3/0484; G06F 17/20; G06F 17/2775; G06Q 10/06311; G06Q 10/109

See application file for complete search history.

(56) References Cited

U.S. PATENT DOCUMENTS

| | | |
|---|---|---|
| 2011/0289422 A1 | 11/2011 | Spivack et al. |
| 2012/0192096 A1 | 7/2012 | Bowman et al. |

(Continued)

FOREIGN PATENT DOCUMENTS

| | | |
|---|---|---|
| CN | 103702401 A | 4/2014 |
| WO | 0225513 A2 | 3/2002 |
| WO | 2013155619 A1 | 10/2013 |

OTHER PUBLICATIONS

"Office Action Issued in Indian Patent Application No. 201917021585", dated Sep. 16, 2021, 9 Pages.

(Continued)

*Primary Examiner* — Daniel T Pellett
(74) *Attorney, Agent, or Firm* — Faegre Drinker Biddle & Reath LLP

(57) ABSTRACT

Disclosed are techniques for extracting, identifying, and consuming imprecise temporal elements ("ITEs"). A user input may be received from a client device. A prediction may be generated of one or more time intervals to which the user input refers based upon an ITE model. The user input may be associated with the prediction, and provided to the client device.

20 Claims, 22 Drawing Sheets

(51) Int. Cl.
*G06F 16/332* (2019.01)
*G06F 3/023* (2006.01)
*G06F 40/00* (2020.01)
*G06F 40/289* (2020.01)

(56) References Cited

U.S. PATENT DOCUMENTS

| | | |
|---|---|---|
| 2012/0271676 A1 | 10/2012 | Aravamudan et al. |
| 2013/0278492 A1 | 10/2013 | Stolarz et al. |
| 2014/0006328 A1 | 1/2014 | Blanco et al. |
| 2016/0342886 A1 | 11/2016 | Allen et al. |

OTHER PUBLICATIONS

"First Office Action and Search Report Issued in Chinese Patent Application No. 201780074271.3", dated Nov. 17, 2021, 9 Pages.

Assuming that today is Jan 12, 2016

What does "later this week or early next week" mean to you?

Select a date range below, and hit submit.

From 2016-01-14 to [ ] Submit

| Su | Mo | Tu | We | Th | Fr | Sa |
|----|----|----|----|----|----|----|
|    |    |    |    |    | 1  | 2  |
| 3  | 4  | 5  | 6  | 7  | 8  | 9  |
| 10 | 11 | 12 | 13 | 14 | 15 | 16 |
| 17 | 18 | 19 | 20 | 21 | 22 | 23 |
| 24 | 25 | 26 | 27 | 28 | 29 | 30 |
| 31 |    |    |    |    |    |    |

SYSTEM FOR INTERPRETING AND MANAGING IMPRECISE TEMPORAL EXPRESSIONS

This application is a continuation of U.S. patent application Ser. No. 15/368,314, filed Dec. 2, 2016, the entire contents of which is incorporated herein by reference.

FIELD OF THE DISCLOSURE

The present disclosure relates generally to techniques for helping users to complete tasks and to plan future activities.

BACKGROUND

Automated personal assistants (e.g., virtual assistants) can support a range of reactive and proactive scenarios ranging from question answering to providing an alert about plane flights and traffic. Some automated personal assistants can provide reminder services aimed at helping people to remember future tasks that they may otherwise forget. An automated personal assistant may use natural language to access a device's commands, settings, and integrated services. In many cases, these interactions can require that the user communicate a date and/or time. For example, a time indication is required when a user would like to create an appointment, set a reminder, and/or inquire about weather, sports, news, request a timeline of a project, etc. Whether issuing commands or retrieving information, a user is encouraged, by convention and instruction, to structure the user's utterances as if the user were speaking with a real person. However, these types of interpersonal communications often give rise to temporal expressions that are imprecise, nuanced, and/or ambiguous. Thus, in communications and planning, users often express uncertainty about time using imprecise temporal expressions ("ITEs"). ITEs can serve communicative purposes (e.g., conveying priority, flexibility, or one's own uncertainty), but modern automated personal assistants lack system support to capture the intent behind an ITE systems to respond appropriately. This can result in unnatural interactions and undesirable interruptions. For example, a conventional automated personal assistant may interpret "sometime later today" as meaning 12:00 PM, when the user intended it to be 2:00 PM. Thus, a system is needed that can identify ITEs and generate a prediction of one or more approximate time intervals so that it can be consumed by a device's automated personal assistant, predictive services, scheduling service, etc.

SUMMARY

In an implementation, a system is disclosed that can include a database and a processor communicatively coupled thereto. The database may store an imprecise temporal expression model. The ITE model may be generated by the processor in some instances. The processor may be configured to receive, from a client device, a user input. The user input may be received by the system in the form of a voice and/or text input. A prediction of one or more intervals of time to which the user input refers may be generated based upon the ITE model in the database. The user input may include at least one of an ITE, a contextual text, and a time of interaction. In the event the user input includes an ITE, the processor may be configured to detect the ITE. In some instances, the prediction may be presented to the client device (or a server) and a request may be generated to receive a user input to confirm the prediction. In some instances the processor may receive an indication to modify the prediction, and update the ITE model in the database based upon the indication. The prediction may be associated with the user input. The processor may provide the prediction to the client device. The processor may be configured to display the prediction on the client device at a time corresponding to the user input. The prediction may be provided to the client device in a variety of ways such as via a reminder, a notification, an auto-completion of text, a timeline, a task list, a calendar scheduling, a time interval, a ranked list of time intervals, a probability distribution, etc.

According to an implementation, a method is provided in which a user input is received from a client device. A prediction can be generated based upon the ITE model. The user input may be associated with the prediction, and the prediction may be provided to the client device.

In an implementation, a non-transitory computer readable medium having stored thereon computer readable instructions that are executable to cause one or more processors to perform operations is disclosed. A user input from a client device may be received. An operation may include generating a prediction of one or more intervals of time to which the user input refers may be generated based upon the ITE model in the database. The user input may include at least one of an ITE, a contextual text, and a time of interaction. The user input may be associated with the prediction, and the computer readable instructions may cause the prediction may be provided to the client device.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 illustrates examples of probability distributions for tasks that are set to notify a user during office hours and those that trigger outside these hours.

FIG. 5 illustrates examples of reminder notification time probability distributions for "Communicate/General" and "Communicate/Coordinate" tasks according to an implementation disclosed herein.

FIG. 17 shows an example of a dialogue that can be displayed to a user to receive the user's direct input regarding an interval of time the user assigns to a term according to an implementation.

FIG. 18A shows an example distribution of responses for the term "early next week. " FIG. 18B shows an example distribution of responses for the term "next weekend. " FIG. 18C shows an example distribution of responses for the term "later this week."

FIG. 20 illustrates an example of an interpretation of "later this week" on different days of the week based on the crowdsourced results. The numbers shown are the proportion of workers that include the particular execution date in their range of interpretation.

DETAILED DESCRIPTION

Figure 1:
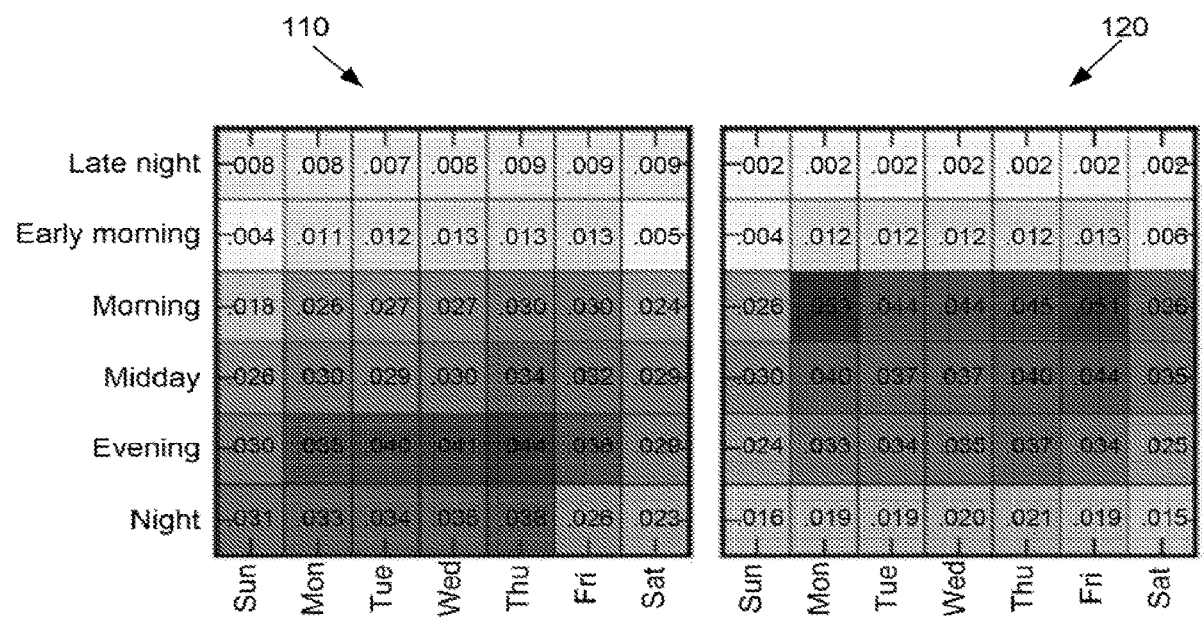
FIG. 1 illustrates an example of the prior probability of a reminder's creation time $P(r_{CT})$, and notification time, $P(r_{NT})$, in each cell in $M^{CT}$ and $M^{NT}$ according to a disclosed implementation.

Modern automated personal assistants often insist that dates and times be specified precisely, or will rigidly disambiguate a limited set of temporal expressions to predetermined wall-clock times (e.g., mapping "morning" to 7:00 AM). While early resolution of these expressions may be the easiest solution for system designers and implementers, this strategy can lead to breakdowns in the user experience. Users are often strategic in their use of temporal expressions so as to convey their own uncertainty, commitment, or task priority. In these scenarios, insisting that users input specific times or dates may increase the burden of using the system. Likewise, overly literal interpretations of temporal expressions may result in reminders or notifications being delivered at inappropriate times (e.g., a user specifying "this afternoon" may not want or expect a reminder to be delivered at precisely 12:00 PM). Table 1 is an example of imprecise and precise date or time expressions. Table 2 lists several other types of ITEs. A precise date resolves to the entirety of a specific calendar day when taken in conjunction with a reference time (e.g., the time the expression was uttered). An ITE can refer to a temporal expression that neither resolves to a precise date (i.e., the entirety of a calendar day), nor a precise time (i.e., a time with both hour and minute specified).

TABLE 1

| Type | Expression |
| --- | --- |
| Imprecise | a little more than a week later |
| | tomorrow evening |
| | this weekend |
| Precise date | 21 Sep. 2016 |
| | tomorrow |
| | this Thanksgiving |
| Precise time | 21 Sep. 2016, 8:00 PM EDT |
| | 8:00 AM tomorrow |
| | in 15 minutes |

TABLE 2

| Type | Expression |
| --- | --- |
| Blurred time, e.g., a precise time point with an imprecise modifier | around 2:00 PM |
| Blurred duration, e.g., a precise duration expression with an imprecise modifier | about three hours |
| Imprecise quantity, e.g., a time or duration that is expressed only with imprecise quantity words | a few days<br>several weeks<br>a couple of months |
| Half-open period, e.g., a half-open, half-closed time period anchored at a precise/imprecise time point | no later than tomorrow noon |
| Conjunct time, e.g., an expression that combines two or more precise/imprecise expressions | later today or early tomorrow |
| Ambiguous time, e.g., an expression that can have two or more distinct interpretations | next weekend<br>on a Monday morning |
| Imprecise moments/periods | morning<br>tomorrow evening<br>later today<br>early next month |
| Personal or cultural milestones | after work<br>before bed<br>over the holidays<br>Christmas Eve<br>Thanksgiving weekend |

Disclosed herein are systems and methods that (1) receive user input such as text or natural language, (2) generate a prediction of one or more intervals of time to which the user input refers, and/or (3) provide a predictive service that facilitates data input and/or deliver time-relevant information to the user in a manner that is appropriate given the uncertainties involved. For example, the resultant prediction may represent the system's belief of when events are likely to occur or have occurred, and/or when actions should be taken (e.g., a notification sent, an alarm and/or alert). An alert may refer to a visual, tactile, or auditory feedback (e.g., emitting a sound, displaying text or a notice, illuminating a light emitting diode, etc.). The prediction can be based upon an ITE model that may account for a variety of factors such as the time when the expression is uttered or written, the content/topic of the enclosing utterance or text, and/or details known about the user. The ITE model may refer a series of distributions indicating a belief of a reference time or interval of time to which an ITE or event (e.g., mow the lawn) likely refers. The ITE model can be generated in a variety of ways as described below. Briefly, an ITE model can be developed based upon an analysis of data logs such as those corresponding to an email corpus and/or an automated personal assistant. More than one ITE model can be generated (e.g., a model can exist for each ITE), and an ITE model can be updated and/or specific to a particular user or group of users.

Because ITEs may refer to the past, the disclosed implementations can have practical applications beyond reminders or future intent. For example, the disclosed system may analyze the text of a user's past emails to determine at least one interval of event(s) that have occurred, and place those events on a timeline that can be displayed to the user. ITEs or specific contextual text (e.g., words that potentially indicate a time element such as "Halloween" or "mow the lawn") can be detected automatically in the text of the email A user may request a timeline be generated from past email associated with a particular keyword, for example. ITEs associated with the identified subset of email may be detected and displayed as a timeline to the user to obtain an overview of the lifetime of a project or relationship between phases of a project.

A predictive service may facilitate time expression output. As an example of a predictive service, when authoring a to-do task in a calendaring application, the system can leverage the current time of day, and the text of the to-do item, to suggest automatically deadlines and/or notification times from which a user can choose. As another example, speech recognition or data extraction processes can leverage an ITE model to refine a hypothesis (e.g., n-best list) when a user dictates a to-do item, a calendar appointment, etc. For low certainty items that are likely to become "due" in the near future, an automated personal assistant can seek additional scheduling clarification as part of some later maintenance task. For example, the assistant may ask for scheduling guidance the next time the user opens a calendar, or as a part of daily briefings delivered at convenient down-times (e.g., at the start or end of the day).

A prediction may be returned to a client device and/or to a server in a variety of ways. The format of a prediction can be provided in a user observable form such as a task list, a reminder, a calendar, a timeline, etc. The prediction may also be in the form of a mathematical representation such as an interval of time and/or a distribution. Examples of such predictions are provided here without limitation below. In some instances, the representation may be stored to the client device, and/or a database connected to a server, for example. In examples 1-14 below, standard mathematic notation is applied such that "[a,b]" indicates an interval inclusive of an and b, and "[a,b)" indicated an interval of a and all points up to but not including b. Similarly, "(a,b]" indicates an interval exclusive of a but includes all points greater than a up to and including b. Finally "(a,b)" includes all points between a and b but excludes a and b themselves and "[a,a]" is a "point interval" that includes the point a and only a.

1) A span of time: for example, "next weekend" can be represented (e.g., computed, stored, displayed, etc.) as [Friday, 12/2/2016, 5:00 p.m.—Monday 12/4/2016, 12:00 a.m.).

2) A ranked list: for example, a prediction may refer to several possible time intervals that are ranked from most likely to least likely based upon aggregated user responses that indicate intervals of time to which a specific user input refers. Other methods of ranking a list based upon the received data may be utilized in lieu of or in addition to such a process. For example, the term "next weekend" may be provided as a ranked list such as Rank 1: [Friday, 12/2/2016, 5:00 p.m.—Monday 12/4/2016, 12:00 a.m.). Rank 2: [Friday, 12/9/2016, 5:00 p.m.—Monday 12/11/2016, 12:00 a.m.). In some configurations, the ranked list may be presented to a user in the form of a dialogue box or the like.

3) An open interval to indefinite future: for example, the term "after this weekend" may be provided as (Monday, Dec. 4, 2016, 12:00 a.m.—InfiniteFutureHorizon).

4) An open interval to indefinite past: for example, the term "before this weekend" may be provided as (InfinitePastHorizon—Friday, 12/2/2016, 5:00 p.m.).

5) A set of non-continuous intervals: for example, the term "during working hours next week" may be provided as a mathematical representation such as {[Monday, 12/5/2016, 9:00 a.m.—Monday 12/5/2016, 5:00 p.m.], [Tuesday, 12/6/2016, 9:00 a.m.—Tuesday 12/6/2016, 5:00 p.m.], [Wednesday, 12/7/2016, 9:00 a.m.—Wednesday 12/7/2016, 5:00 p.m.], [Thursday, 12/8/2016, 9:00 a.m.—Thursday 12/8/2016, 5:00 p.m.], [Friday, 12/9/2016, 9:00 a.m.—Friday 12/9/2016, 5:00 p.m.]}.

6) A ranked list of sets of non-continuous intervals: for example, the term "during working hours next week"->Rank 1: {[Monday, 12/5/2016, 9:00 a.m.—Monday 12/5/2016, 5:00 p.m.], [Tuesday, 12/6/2016, 9:00 a.m.—Tuesday 12/6/2016, 5:00 p.m.], [Wednesday, 12/7/2016, 9:00 a.m.—Wednesday 12/7/2016, 5:00 p.m.], [Thursday, 12/8/2016, 9:00 a.m.—Thursday 12/8/2016, 5:00 p.m.], [Friday, 12/9/2016, 9:00 a.m.—Friday 12/9/2016, 5:00 p.m. Rank 2: a Monday, 12/12/2016, 9:00 a.m.—Monday 12/12/2016, 5:00 p.m.], [Tuesday, 12/13/2016, 9:00 a.m.—Tuesday 12/13/2016, 5:00 p.m.], [Wednesday, 12/14/2016, 9:00 a.m.—Wednesday 12/14/2016, 5:00 p.m.], [Thursday, 12/15/2016, 9:00 a.m.—Thursday 12/15/2016, 5:00 p.m.], [Friday, 12/16/2016, 9:00 a.m.—Friday 12/16/2016, 5:00 p.m.]}.

7) A prediction with a confidence: for example, the term "next weekend" can be provided as a prediction in a form such as 80% Friday, 12/2/2016, 5:00 p.m.—Monday 12/4/2016, 12:00 a.m.).

8) A list of predictions with a confidence in each candidate/subcomponent: for example, the term "next weekend" can be provided as 80% Friday, 12/2/2016, 5:00 p.m.—Monday 12/4/2016, 12:00 a.m.). 20%: Friday, 12/9/2016, 5:00 p.m.—Monday 12/11/2016, 12:00 a.m.).

9) A non-exhaustive list of predictions with a confidence in each candidate/subcomponent (note percentages don't sum to 100): for example, the term "next weekend" can be provided as 50% Friday, 12/2/2016, 5:00 p.m.—Monday 12/4/2016, 12:00 a.m.). 20%: Friday, 12/9/2016, 5:00 p.m.—Monday 12/11/2016, 12:00 a.m.).

10) A list of predictions with a confidence "score" in each candidate/subcomponent (the percentages may not sum to 100%) where a higher/lower score indicates a belief: For example, the term "next weekend" may have the following "scores" associated with it: Score 104.32 Friday, 12/2/2016, 5:00 p.m.—Monday 12/4/2016, 12:00 a.m.). Score 43.43 Friday, 12/9/2016, 5:00 p.m.—Monday 12/11/2016, 12:00 a.m.). These scores may be based upon, for example, an analysis of user data aggregated from various sources (e.g., logs of automated personal assistants).

11) A list of predictions with an overall confidence that the expression is covered by any one subcomponents and the subcomponents sum to unity: For example, the term "next weekend" may be provided as Overall 95%. 80% Friday, 12/2/2016, 5:00 p.m.—Monday 12/4/2016, 12:00 a.m.). 20% Friday, 12/9/2016, 5:00 p.m.—Monday 12/11/2016, 12:00 a.m.). In this example, there may be a 95% confidence that the expression (e.g., ITE) is contained within the two intervals of time provided.

12) A list of predictions with a score that the expression is covered by any one subcomponents and the subcomponents sum to unity: continuing the previous example, rather than reflect an overall confidence of 95%, a score may be provided as, for example, 92.8.

13) An interval with an associated distribution over the interval: for example, for an appropriate parameter choice, $\lambda$, and where $\alpha$=the start of the interval and for any time, t, in the interval, an exponentially decaying probability can be represented as follows: the term "after this weekend" may be represented as $\{(Monday, Dec. 4, 2016, 12:00 a.m.—InfiniteFutureHorizon), \lambda e^{(-\lambda(t-\alpha))}\}$. For large $\lambda$ this may yield a substantially higher probability to points in time shortly after Monday, 12/4/2016, 12:00 a.m. and decay rapidly. For smaller $\lambda$ the probability may decay substantially more slowly. The parameters could be learned from data as part of the process of learning the temporal expression model. Likewise distributions other than the exponential distribution could be used including mixtures of distributions.

14) The prediction may be represented as in any of the preceding examples 1-12 except that a distribution (either continuous or discrete) can be associated with each interval or subcomponent as in preceding example 13.

Thus, each of the above examples illustrate a prediction that can be generated and that can be provided to a client device and/or server, where it can be applied or used by other services. For example, a scheduling application may detect "let's meet sometime this weekend" as an utterance in a videoconference between two users. A server handling the communication between the two users' devices may be provided with a prediction of what "sometime this weekend" in a form such as examples 1-14 above from the users' devices. The server may compare the two provided predictions from the client devices to ascertain any overlap of at least one interval of time, and accordingly propose a meeting time to both users accounting for scheduling conflicts during the overlapping time(s) corresponding to "sometime this weekend." The time may be proposed via a separate application (e.g., an email program or calendar application) or by the videoconference application. The proposed time may be displayed as a dialogue box that requests user confirmation of the appointment.

Several systems have been developed to help remind people about future actions, many of which leverage contextual signals for more accurate reminding. These systems can help generate reminders associated with a range of future actions, including location, events, activities, people, and time. Two of the most commonly supported types of reminders are location- and/or time-based. Location-based reminders can be triggered when people are at or near locations of interest. Time-based reminders can be set and triggered based on time, including those based on elapsed time-on-task. While time-based reminders can provide value to many users, particularly the elderly, users with memory impairments, and/or users seeking to comply with prescribed medications.

Memory aids can help users to remember past events and information. Users tend to leverage both their own memories via recall strategies and the use of external memory aids to increase the likelihood of recall. Aids can assume different forms, including paper to electronic alternatives. One example of a computer-based memory aid is a Remembrance Agent, which can use context information, e.g., words typed into a text processor to retrieve similar documents. Users have been shown to use standard computer facilities to support future reminding (e.g., positioning documents in noticeable places on the computer desktop). Such uses can be inadequate for a number of reasons, including the lack of alerting. Other solutions can use machine learning to predict forgetting, and the need for reminding about events. According to implementations disclosed herein, usage patterns and user behavior are examined and/or quantified to enable an improved understanding of users' needs, develop improved methods for system-user interaction and collaboration, and enhance an understanding of the types of tasks where memory aids provide value.

Prospective memory ("PM") can refer to the ability to remember actions to be performed at a future time. Successful PM requires recall at the appropriate moment. Failures in PM can be linked to external factors such as interruptions. Prospective tasks can be divided into time-based tasks and event-based tasks. Time-based tasks can be tasks targeted for execution at a specific future time, while event-based tasks can be performed when a particular situation or event occurs, triggered by external cues, e.g., person, location, and/or object. As disclosed herein, studying logs of an automated personal assistant can represent a rich resource of real-life, time-based PM instances. These instances can provide insights into the type and nature of tasks that users are likely to forget to execute.

As disclosed herein, the creation of common time-based reminders at scale in natural settings is provided. Second, a taxonomy of types of time-based reminders, facilitated by the data obtained about the reminders created by a large populations of users is disclosed. Third, important aspects of the reminder generation process can be characterized, including their nature (e.g., reminding about ongoing versus planned activities), and the relationship between the reminder text and the time of setting the reminder and alerting to remind. A predictive model can be generated based upon the patterns uncovered from data obtained about the reminders. As discussed earlier, the predictive models can be used to determine, for example, when a reminder should be triggered.

Behavior around reminder creation can be examined by observing common tasks linked to setting reminders and determining whether there is a body of common tasks that underlie the reminder creation process. Reminders can be extracted that are observed frequently and across multiple users. The reminders can be categorized in a task taxonomy to better understand the task types associated with the reminders.

In the left column of Table 3, three examples of common reminders are listed. The examples show a structure that is frequently observed in logged reminders obtained from an automated personal assistant. Reminders can be composed as predicate sentences. They can contain a phrase related to an action that the user would like to perform (typically a verb phrase) and a referenced object that is the target of the action to be performed.

TABLE 3

| Reminder | Predicate |
| --- | --- |
| Remind me to take out the trash | Take out (me, the trash) |
| Reminder me to put my clothes in the dryer | Put (me, clothes in dryer) |
| Reminder me to get cash from the bank | Get (me, cash from the bank) |

A session for setting a reminder can include a dialog, where the user and the automated personal assistant can interact in multiple turns. The user can begin by issuing the command for setting a reminder, and dictating the reminder. Optionally, the user can specify the reminder's notification time. Next, the automated personal assistant can request to specify the time (if the user has not yet specified it), or provide a summary of the reminder, (i.e., the task description and notification time, asking the user to confirm or change the proposed reminder).

Logs from an automated personal assistant can be analyzed to extract information relevant to reminders. The logs can be pre-processed to include, for example, only reminders from the United States market. Other data sets, such as an email corpus or other sources of natural language usage, can be used to generate an initial ITE model and/or to update an ITE model. In an implementation, the analysis can be focused on specific reminders such as time-based reminders, and remove location (e.g., "remind me to do X when I am at Y"), and person-based reminders (e.g., "remind me to give X when I see Y"), which are less common. The pre-processing can further focus on those reminders that are confirmed by the user. In an example of such preprocessing of the logs from an automated personal assistant, a sample size of 576,080 reminders from 92,264 users was obtained for a two month time period. For each reminder, the reminder task description and notification time can be extracted. The creation time can be extracted based upon the local time of the user's device. Each reminder can be represented by:

$r_{task}$: The reminder's textual task description, which can refer to the phrase which encodes the future task or action to be taken, as dictated by the user.

$r_{CT}$: The reminder's creation time, which can refer to the time at which the user encodes the reminder. The term $r_{CT}$ can be represented as a discretized time-value as described below. This timestamp can be extracted from the client's device.

$r_{NT}$: The notification time set for the reminder to trigger an alert. These data can refer to the time at which the user wishes to be reminded about a future task or action, and can be represented in the same discretized manner as $r_{CT}$.

$r_{AT}$: Subtracting the creation time from the notification time can yield the time delta, which can refer to the delay between the reminder's creation and notification time. Reminders with smaller time deltas can represent short-term or immediate tasks (e.g., "remind me to take the pizza out of the oven"), whereas reminders with larger time deltas can represent tasks planned further ahead in time (e.g., "remind me to make a doctor's appointment").

In an implementation, common reminders are identified. A common reminder may refer to a reminder that is frequently observed across multiple users. Common task types can be identified using a data-drive and/or qualitative methodology to extract and identify common task types.

A frequent task description can be extracted as disclosed herein. First, common task descriptions can be extracted by leveraging the predicate (e.g., verb+object) structure described earlier. To ensure that the underlying task descriptions represent broad tasks, the data set can be narrowed or filtered to include those descriptions that start with a verb (or a multi-word phrasal verb) that occurs, for example, at least 500 times, across at least ten users, with at least five objects. In the example data set, this can yield a set of 52 frequent verbs, which can include 60.9% of the reminders in the example data set. The relatively small number of verbs which cover the majority of reminders in the example log data can indicate that there are likely many common task types that give rise to reminder creation. To further analyze the underlying tasks, the most common objects can be included, for example, by pruning objects observed less than five times with a verb. This can yield a set of 2,484 unique task descriptions (i.e., verb+object), covering 21.7% of the example log data.

Common tasks which underlie the frequent task descriptions can be identified and/or categorized into a broader task type taxonomy. As an example, dimensions that commonly separate tasks can be: whether the task represents an interruption or continuation of a user's activity, the context in which the task is to be executed (i.e., at home, at work), and the (expected) duration of the task. Based on this analysis, the frequent task descriptions can be labeled as belonging to one of six broad task types with several subclasses.

The six task types identified in the example data set are described below, and examples of the associated verb+object patterns are provided. Other task types may be identified by performing the aforementioned analyses on a different data set. The example objects are shown in decreasing order of frequency, starting with the most common. Verbs may not be uniquely associated with a single task type, but the verb+object-pair may determine the task type (compare, e.g., "start dishwasher" to "start cooking").

A first task type identified in the example data set can refer to going somewhere. Approximately 33.0% of the frequent tasks can refer to the user moving from one place to another. Two subtypes can be distinguished within this task type. The first subtype can refer to running an errand (83.2% of the data set), where the reminder can refer to executing a task at some location (e.g., "pick up milk"). Running an errand can represent an interruption of the user's activity, but a task of a relatively small scale. For example, it can be a task that briefly takes up the user's availability. The second subtype can be more comprehensive, and can represent tasks which are characterized by a switch of context (16.8% of the data set), e.g., moving from one context or activity to another ("go to work", "leave for office"), which can have a larger impact on the user's availability. Examples of these subtypes are provided in Tables 4 (run errand) and Table 5 (switch context), respectively.

TABLE 4

| Example verbs | Example objects |
| --- | --- |
| grab [something] | laundry, lunch, headphones |
| get [something] | batteries |
| pick up [something/someone] | laundry, person, pizza |
| buy [something] | milk, flowers, coffee, pizza |
| bring [something] | laptop, lunch, phone charger |
| drop off [something] | car, dry cleaning, prescription |
| return [something] | library books |

TABLE 5

| Example verbs | Example objects |
| --- | --- |
| leave (for) [some place] | house, work, airport |
| come [somewhere] | house, back to work, in |
| be [somewhere] | be at work, at home |
| go (to) [somewhere] | gym, work, home, appointment |
| stop by [some place] | bank, retailer |
| have (to) [something] | work, appointment |

The second most common type of reminders in the example data set can be referred to as daily chores (23.8% of example data). Two subtypes can be identified: recurring (66.5%) and standalone chores (33.5%). Both types represent smaller-scale tasks which briefly interrupt the user's activity. Tables 6 and 7 provide examples of these subtypes, respectively; other subtypes may be identified in other data sets.

TABLE 6

| Example verbs | Example objects |
| --- | --- |
| take out [something] | trash, bins |
| feed [something] | dogs, meter, cats, baby |
| clean [something] | room, house, bathroom |
| wash [something] | clothes, hair dishes, car |
| charge [something] | phone, activity tracker, batteries |
| do [something] | laundry, homework, taxes, yoga |
| pay [something] | rent, bills, phone bill |
| set [something] | alarm, reminder |

TABLE 7

| Example verbs | Example objects |
| --- | --- |
| write [something] | check, letter, thank you note |
| change [something] | laundry, oil, air filter |
| cancel [something] | subscription |
| order [something] | pizza, flowers |
| renew [something] | books, driver's license, passport |
| book [something] | hotel, flight |
| mail [something] | letter, package, check |
| submit [something] | timesheet, timecard, expenses |
| fill out [something] | application, timesheet, form |
| print [something] | tickets, paper, boarding pass |
| pack [something] | lunch, gym clothes, clothes |

Another common task identified in the example data set can refer to a reminder to contact (e.g., "call," "phone," "text") another individual such as a person (e.g., "mom," "jack," "jane"), organization/company, or other ("hair dresser," "doctor's office"). Two subtypes can be identified: the majority of the example data can be referred to as general, unspecified communication (94.7% of the example data) (e.g., "call mom"), and a smaller part (5.3% of the example data) can be referred to as coordination or planning tasks (e.g., "make doctor's appointment"). Both subtypes can represent tasks which briefly interrupt the user's activity. Tables 8 and 9 provide examples of general and coordinate subtypes, respectively.

TABLE 8

| Example verbs | Example objects |
| --- | --- |
| send [something] | email, text, report |
| email [something] | dad, mom |
| text [something] | mom, dad |
| call [something] | mom, dad |
| tell [someone] [something] | my wife I love her, happy birthday mom |

TABLE 9

| Example verbs | Example objects |
| --- | --- |
| set [an appointment] | doctor's appointment |
| make [an appointment] | doctor's appointment, reservation |
| schedule [an appointment] | haircut, doctor's appointment |

A fourth common task that can be identified can be referred to as management of an ongoing external process. These types of tasks comprised 12.9% of the example data set. Manipulation of an ongoing, external process can refer to, for example, tasks where the user monitors or interacts with something such as laundry or an oven. These tasks can be characterized in that they briefly interrupt a user's activity and can be less comprehensive than performing a chore. Table 10 provides examples of such tasks.

TABLE 10

| Example verbs | Example objects |
| --- | --- |
| turn [on/off] [something] | water, oven, stove, heater |
| check [something] | email, oven, laundry, food |
| start [something] | dishwasher, laundry |
| put [something] in [something] | pizza in oven, clothes in dryer |
| take [something] out | pizza, chicken, laundry |

A fifth class of common tasks that can be identified can refer to management of an ongoing user activity. This class of reminders is similar to the previous class; however, as opposed to the user interacting with an external process, the task can reflect a change in the user's own activity. These tasks can incur a higher cost on the user's availability and cognitive load. In the example data set, three subtypes can be identified: preparing (31.4%), starting (61.4%), and stopping an activity (7.2%). Tables 11-13 provide examples of these three subtypes, respectively.

TABLE 11

| Example verbs | Example objects |
| --- | --- |
| get ready [to/for] | work, home |

TABLE 12

| Example verbs | Example objects |
| --- | --- |
| start [some activity] | dinner, cooking, studying |
| make [something] | food, breakfast, grocery list |
| take [something] | a shower a break |
| play [something] | game, console, basketball |
| watch [something] | television show, sports game, |

TABLE 13

| Example verbs | Example objects |
| --- | --- |
| stop [some activity] | reading, playing |
| finish [something] | homework, laundry, taxes |

Another frequent reminder type can refer to consuming something, most often food (e.g., "have lunch") or medicine (e.g., "take medicine"). These tasks can be small and range from brief interruptions (e.g., "take pills") to longer interruptions ("have dinner"). Table 14 lists examples of this reminder type.

TABLE 14

| Example verbs | Example objects |
| --- | --- |
| take [something] | medicine |
| eat [something] | lunch, dinner, breakfast, pizza |
| have [something] | lunch, a snack, breakfast |

The temporal patterns of reminders can be analyzed to determine, for example, when users create reminders, when reminders are set to notify users, and the average delay between creation and notification time for different reminders. Based upon these determinations, new competencies to reminder services can be provided, such as providing likelihoods about when certain tasks tend to happen, suggesting notification times (slot filling), predicting (follow-up) tasks, and/or proactively blocking out time on users' calendars.

Common temporal patterns of reminders can be analyzed by discretizing time by dividing each day into, for example, six four-hour buckets: (i) late night (e.g., 00:00-04:00), (ii) early morning (e.g., 04:00-08:00), (iii) morning (e.g., 08:00-12:00), (iv) afternoon (e.g., 12:00-16:00), (v) evening (e.g., 16:00-20:00), and (vi) night (e.g., 20:00-00:00). The time-of-day division combined with the days of week may yield a 7 by 6 matrix, M, whose columns can represent days, and rows can represent times. Each $r_{CT}$ and $r_{NT}$ can be represented as a cell in the matrix, M, i.e., Mi,j where i corresponds to the day of week, and j to the time of day. Furthermore, $M^{CT}$ and $M^{NT}$, corresponding to the matrices whose cells may contain reminders that are created, or respectively set to notify, may be distinguished at a particular day and time. Each reminder may be represented as an object r∈M, with the attributes described earlier such as: the reminder's task description ($r_{task}$), creation time ($r_{CT}$), notification time ($r_{NT}$), and time delta ($r_{\Delta T}$). Temporal patterns can be examined based upon, for example, the number of reminders that are created, whose notifications are set, and/or per cell. Conditional probabilities can be computed over the cells in $M_{CT}$ and $M_{NT}$, where the reminder's creation or notification time can be conditioned, for example, on the task type, time, and/or the terms in the task description.

$$P(r_{CT} = X \mid w) = \frac{|r \in R : w \in r_{task} \wedge r_{CT} = X|}{|w \in r_{task}, r \in M^{CT}|} \quad \text{Equation 1}$$

$$P(r_{NT} = X \mid w) = \frac{|r \in R : w \in r_{task} \wedge r_{NT} = X|}{|w \in r_{task}, r \in M^{NT}|} \quad \text{Equation 2}$$

The conditional probability of a notification or creation time, given a term from the task description, can be estimated by taking the set of reminders containing term w, that are created or whose notification is set at time X, over the total number of reminders which contain the word (see, e.g., Eq. 1 and/or Eq. 2). A probability distribution over matrix M can be generated by computing this probability for each cell in $M^{NT}$ or $M^{CT}$, (i.e., $\Sigma_{i,j \in M^{CT}} P(r_{NT}=i,j|w)$).

$$P(r_{NT} = X \mid r_{CT} = i, j) = \frac{|r \in M_{i,j}^{CT} : r_{NT} = X|}{|r \in M_{i,j}^{CT}|} \quad \text{Equation 3}$$

A probability distribution for a reminder's notification time given a creation time (see, e.g., Eq. 3) can be generated to determine the common patterns of the periods of time between the creation of reminders and notifications. Such a probability distribution can be computed, for example, by taking the reminders in each cell of $M^{CT}$ that have their notifications set to be triggered at time X, over all the reminders in that cell.

The delay between setting and executing reminders can be analyzed, for example, by collecting counts and plotting histograms of $r_{\Delta T}$ of reminders for a given subset, e.g., $|r_{CT} \in R : w \in r|$ or $|r_{CT} \in R : r_{CT}=X|$.

FIG. 1 illustrates an example of the prior probability of a reminder's creation time $P(r_{CT})$, and notification time, $P(r_{NT})$, in each cell in $M^{CT}$ and $M^{NT}$. FIG. 1 is based upon the example data set of 576,080 reminders. The first plot 110 is a distribution of reminder creation times and the right plot 120 is a distribution of reminder notification times for all reminders in the example data set (n=576,080). In the example data set, planning (reminder creation) most frequently happens later in the day, more so than during office hours (morning and midday). This may be a reflection of the user's availability. For example, users may have more time to interact with their mobile devices in the evenings. Additionally, the end of the day may be considered a natural period of time to "wrap up the day," e.g., looking backward and forward to completed and future tasks. Other data sets may show similar or distinct trends. The disclosed processes of analyzing a data set are not limited to the particular trends illustrated in FIG. 1.

The right plot 120 of FIG. 1 shows a slightly different pattern regarding the notification times. In the example data set, users executed tasks (i.e. notifications trigger) throughout the day, from morning to evening. This may indicate that users prefer to be reminded of tasks throughout the day, in different contexts (e.g., both at home and at work). This can also be reflected in the task-type taxonomy, where tasks can be related to both contexts. In the example data set, slightly more notifications trigger on weekdays than in weekends, and more notifications trigger at the start and end of the workweek. This observation may be attributed to the same phenomenon for reminder creation. Users may tend to employ reminders for activities that switch between week and weekend contexts. Finally, comparing the two plots shows the notification times are slightly less uniformly distributed than creation times, e.g., users create reminders late at night, when it is relatively unlikely for notifications to be triggered.

Figure 2:
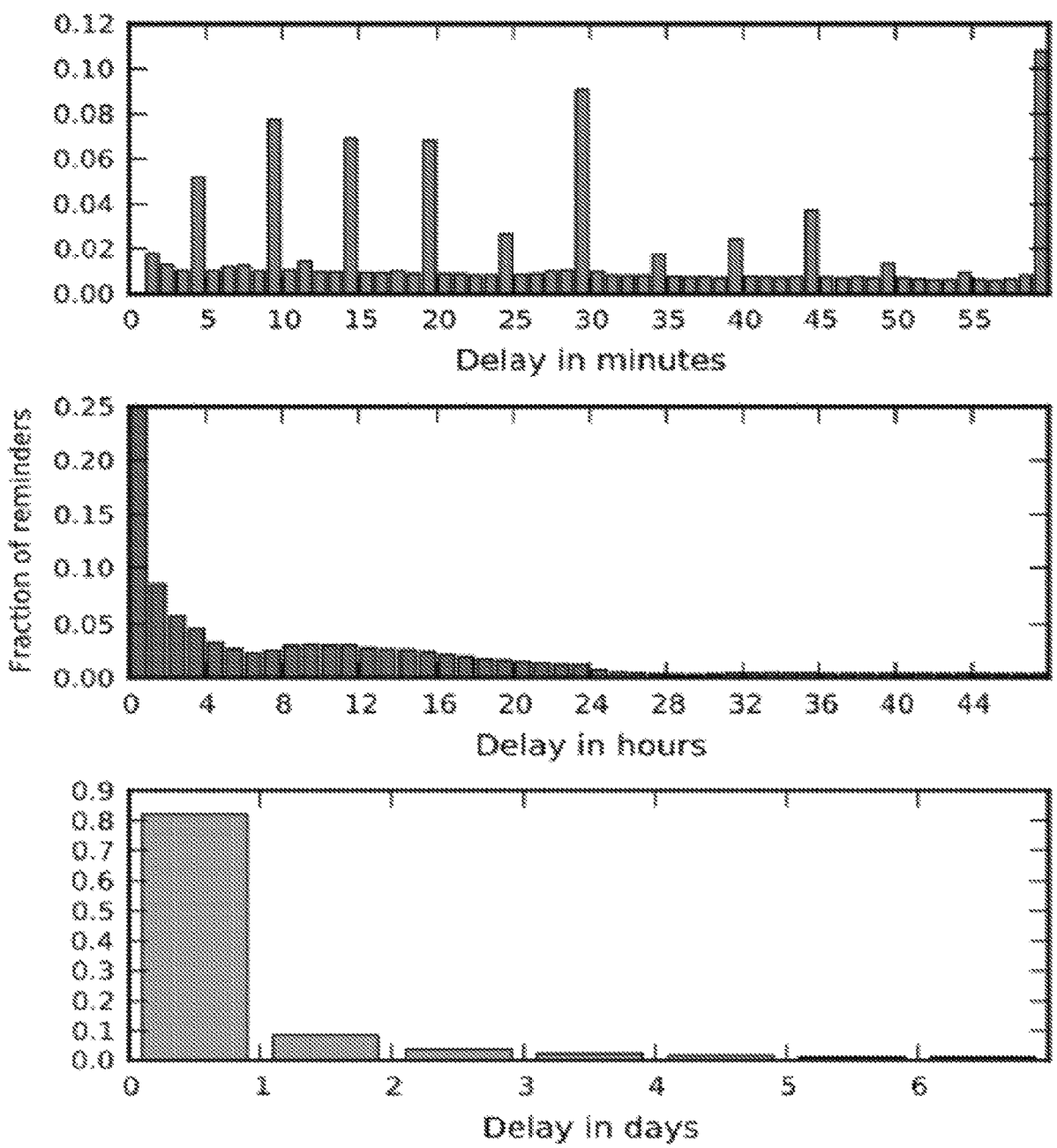
FIG. 2 is an example of plots of the example data set of the delays between reminder creation and notification.

Next, to determine how far in advance users typically plan, the example data set was analyzed for the delays between reminder creation and notification as illustrated in FIG. 2. The top histogram shows distinct spikes around five-minute intervals, which can be due to reminders with a relative time indication (e.g.: "remind me to take out the pizza in five minutes"). These intervals can be more likely to come to mind than more obscure time horizons (e.g., "remind me to take out the pizza at 6:34 PM."). The middle and bottom histograms in FIG. 2 clearly illustrate that the majority of reminders in the example data set have a short delay. Approximately 25% of the reminders in the example data set are set to notify within the same hour (middle histogram), and around 80% of the reminders are set to notify within 24 hours (bottom histogram). There is a small hump around 8-9 hours in the second plot, which may be explained by reminders that span a night, e.g., created at the end of the day, to notify early the next day), or a "working day" (e.g., creation in the morning, notification at the end of the day).

In summary, the analysis of the example data set revealed that on average users tend to set plans in the evening, and execute them throughout the day. Furthermore, most tasks that drive reminder setting tend to be for short-term tasks to be executed in the next 24 hours.

The example data set was next analyzed to determine whether different task types are characterized by distinct temporal patterns that differ from the global patterns seen in the above analysis. To do so, the set of 2,484 frequent reminders (e.g., unique task descriptions) is used to label the example data set reminders. This yielded a subset of 125,376 reminders with task type-labels that were used for analysis. Other data sets of automated person assistants may have different percentages and may reveal different patterns for a given set of users.

Figure 3:
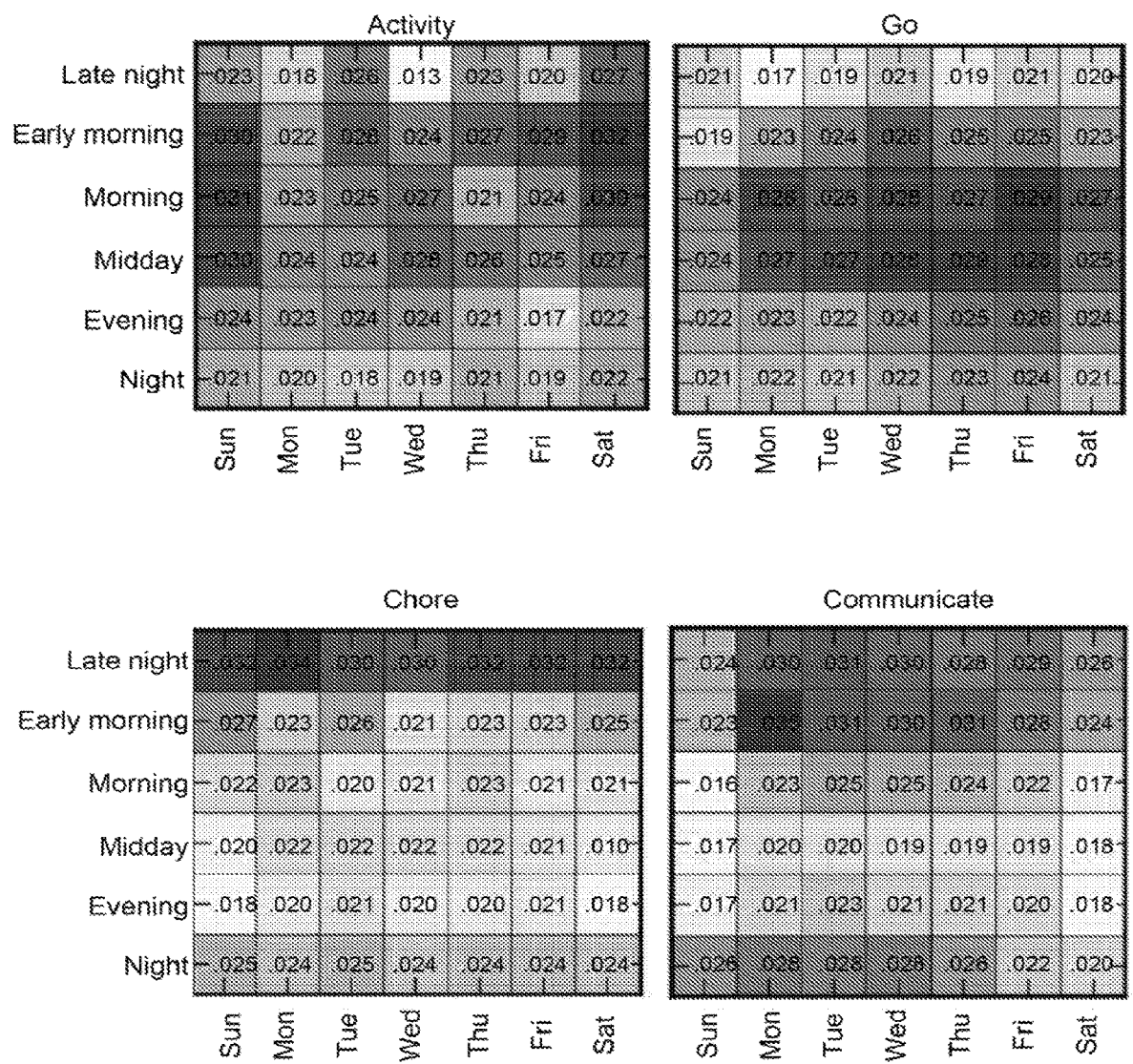
FIG. 3 shows examples of both per task type reminders and outside these blocks. "Activity" and "Going somewhere" reminders tend to be mostly created during office hours, while e.g., "Communicate" and "Chore" reminders tend to be more prone to be created in evenings.

The probability distribution of reminder creation times per task type, i.e., $P(r_{CT}|tasktype)$ was analyzed. Based upon this analysis of the example data and the resultant distributions for each task type, two broader groups can be identified: per task type, reminders can be either created mostly in morning and midday blocks (roughly corresponding to typical office hours), or outside these blocks. FIG. 3 shows examples of both types: "Activity" and "Going somewhere" reminders tend to be mostly created during office hours, while e.g., "Communicate" and "Chore" reminders tend to be more prone to be created in evenings. Activity-related reminders tend to be comparatively frequent on weekends in the example data.

Figure 4:
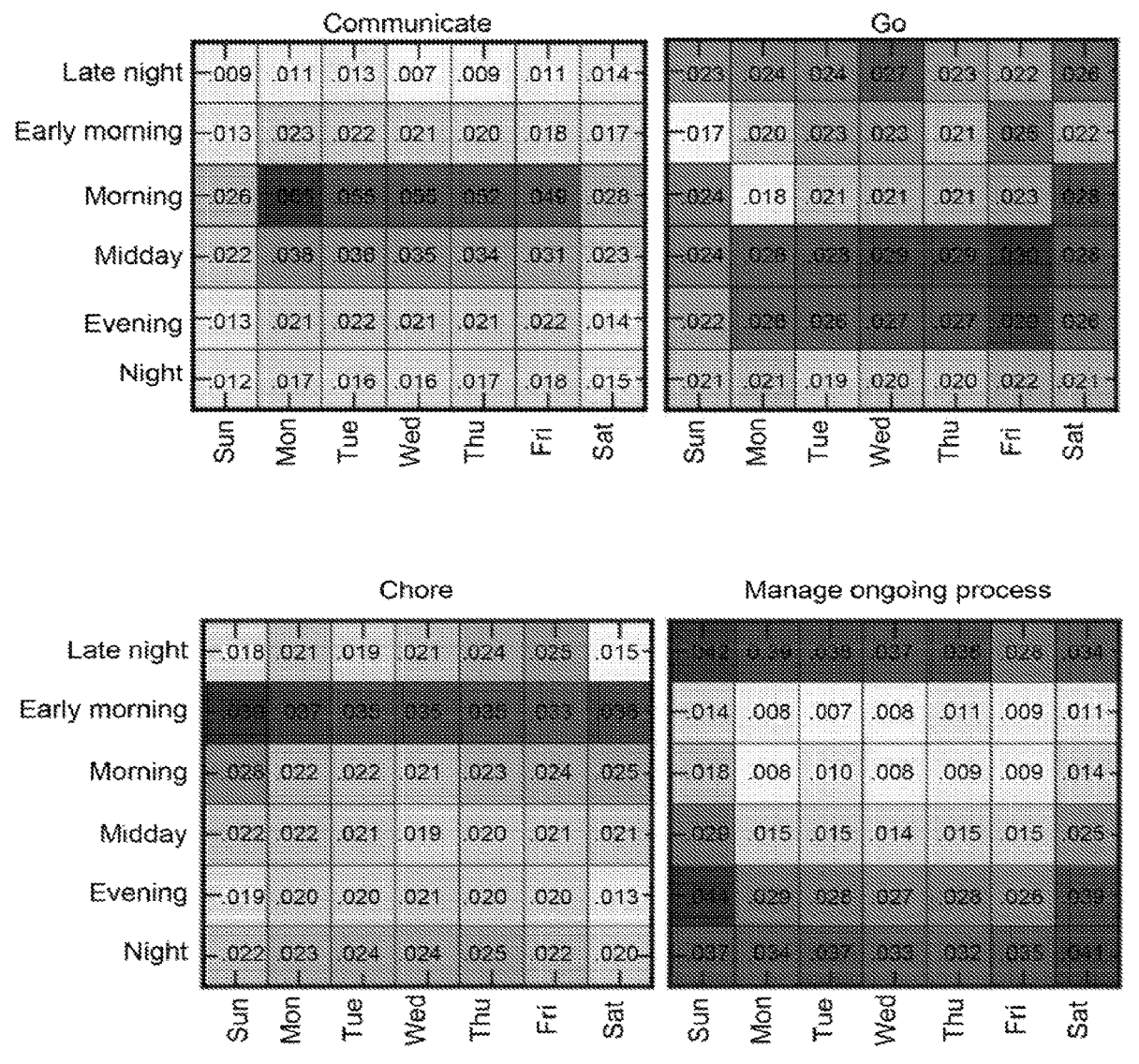

Reminder notification times can also be analyzed per task type, i.e., $P(r_{NT}|tasktype)$. A similar pattern was observed in the example data for this analysis as with the reminder creation times. Two types of tasks were observed: those set to notify during office hours, and those that trigger outside these hours. FIG. 4 illustrates examples of these two types of tasks. "Communicate" and "Go" fall under the former type, whereas "Chore" and "Manage ongoing process" fall under the latter. The nature of the tasks can provide insight into this distinction: the former tend to relate to work-related tasks (communication, work-related errands), whilst the majority of the latter tend to represent activities that are more common in a home setting (cooking, cleaning).

Figure 5:
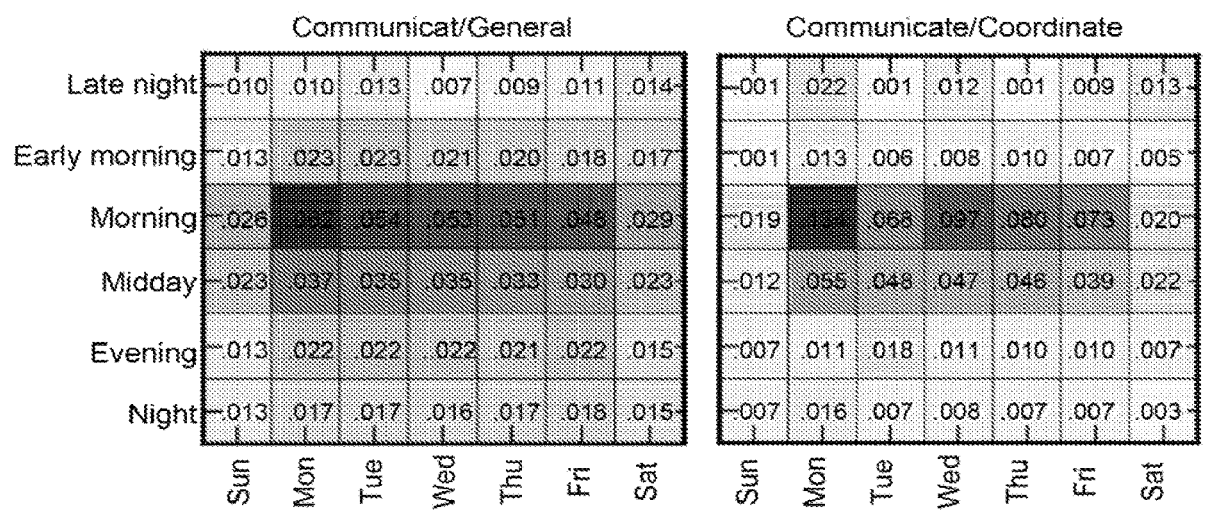

Further analysis of the Communicate task subclasses in FIG. 5 illustrates how "Communicate/General" and "Communicate/Coordinate" differ. "Communicate/General" tends to be more uniformly distributed, whilst the "Communicate/Coordinate" tends to be denser around office hours. The general subtask too can have comparatively more reminders trigger in weekends, whereas the coordinate subtask tends to be more strongly centered on weekdays. The distinct patterns in the example data set can indicate that these subclasses represent different types of tasks.

Figure 6:
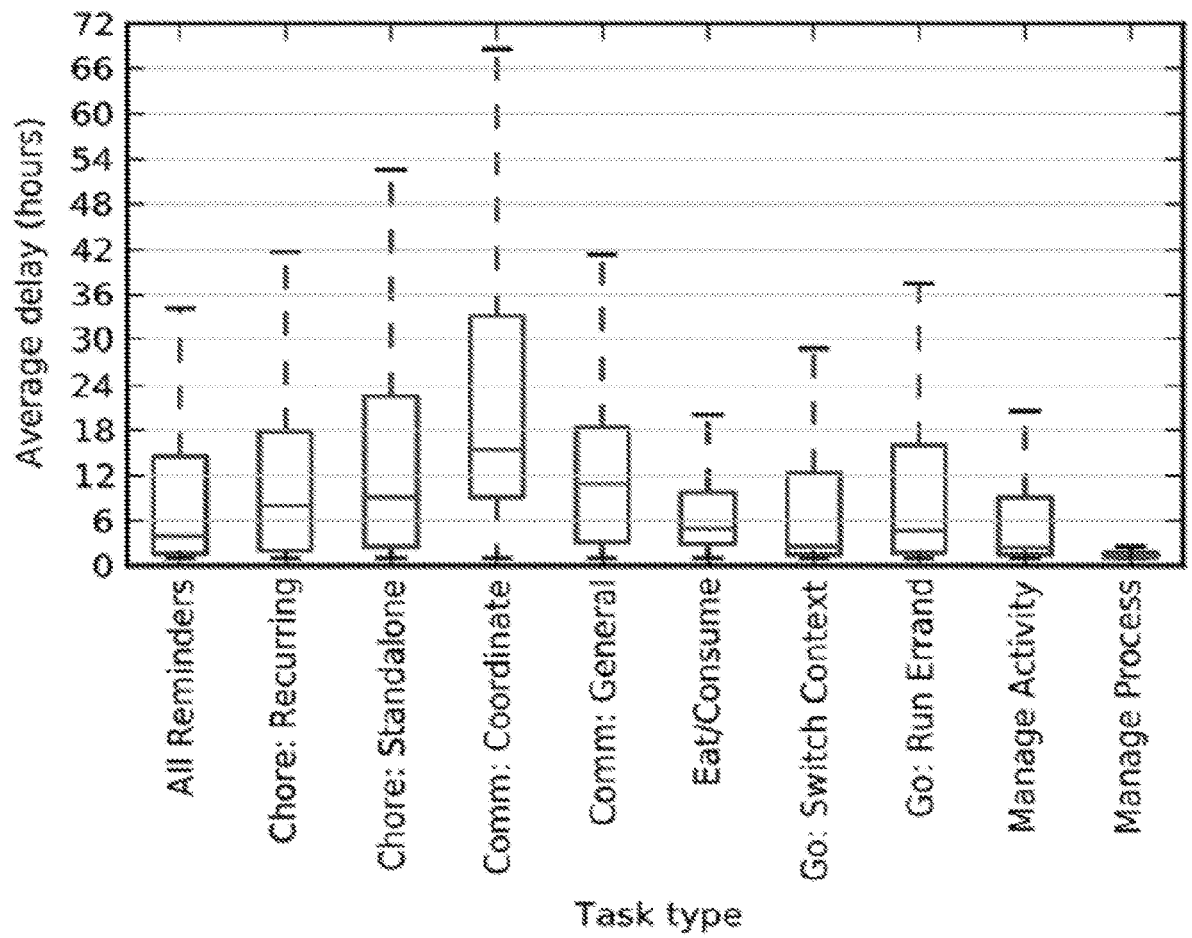
FIG. 6 illustrates examples of boxplots that can show delay between reminder creation and notification times (n=125,376).

The differences in the lead times between reminder creation and notification were analyzed. An overview of the distribution of reminder delays per task type is illustrated in FIG. 6 with respect to the example data. In general, the lower the boxplot lies on the y-axis, the lower the lead time, i.e., the shorter the delay between creating the reminder and executing the task. This can be illustrated by a comparison of, for example, the plot of "Manage ongoing process," to both "Go" or "Communicate" task types. Execution of "managing ongoing process" tasks seem to be planned with a much shorter lead time than the other types of task in the example data. Considering the nature of the tasks, where ongoing processes tend to represent the close monitoring or checking of a process (e.g., cooking or cleaning tasks), it is logical that the delays are on the order of a few minutes, rather than hours. "Communicate/Coordinate" has the largest delay on average in the example data, i.e., it is the task type people plan furthest in advance.

Figure 7:
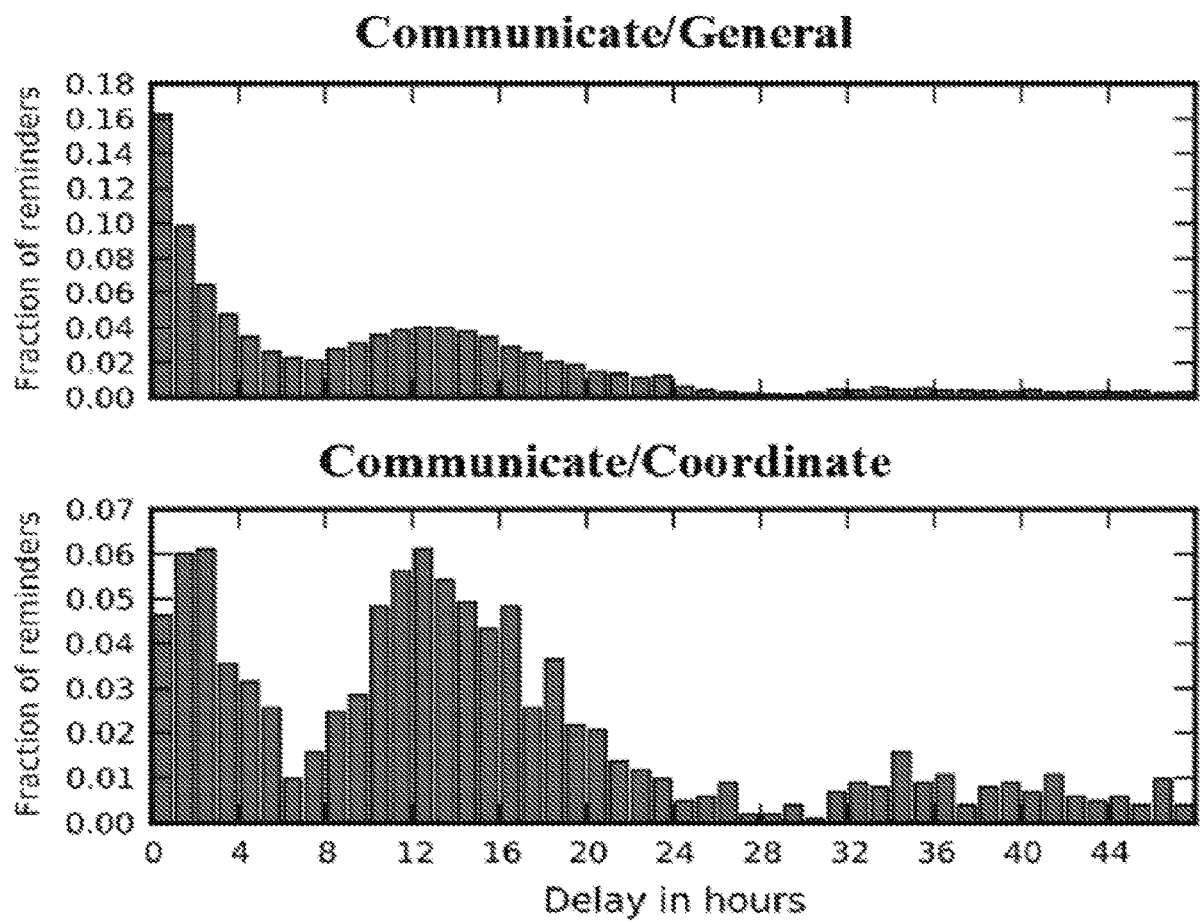
FIG. 7 shows examples of delay (e.g., lead time) between reminder creation and notification for "Communicate" sub-tasks.

A more detailed examination of the differences between the "Communicate" subtasks, as provided in FIG. 7, illustrates that, for example, "Communicate/General" subtasks tend to be more likely to be executed with lower lead time, as noted by the peak at hour 0 in the top histogram. The "Communicate/Coordinate" subtask is about as likely to be executed the next day, as seen by the high peak around the 12 hour mark in the bottom histogram in the example data. Much like the observations made above, the difference in the patterns between both "Communicate" subtasks indicates that the distinction between the subtypes is meaningful. Differences are not only found on a semantic level through the qualitative analysis, but also in temporal patterns.

Based upon the above analyses, task descriptions may show distinct temporal patterns. For example, reminders that contain the term "pizza" are likely to trigger around dinner time. Presence of these temporal patterns may be leveraged for reminder creation or notification time prediction. Conditional probabilities for a cell in $M^{CT}$ or $M^{NT}$ can be computed given a term w (see Eqns. 1 and Eq. 2).

Figure 8:
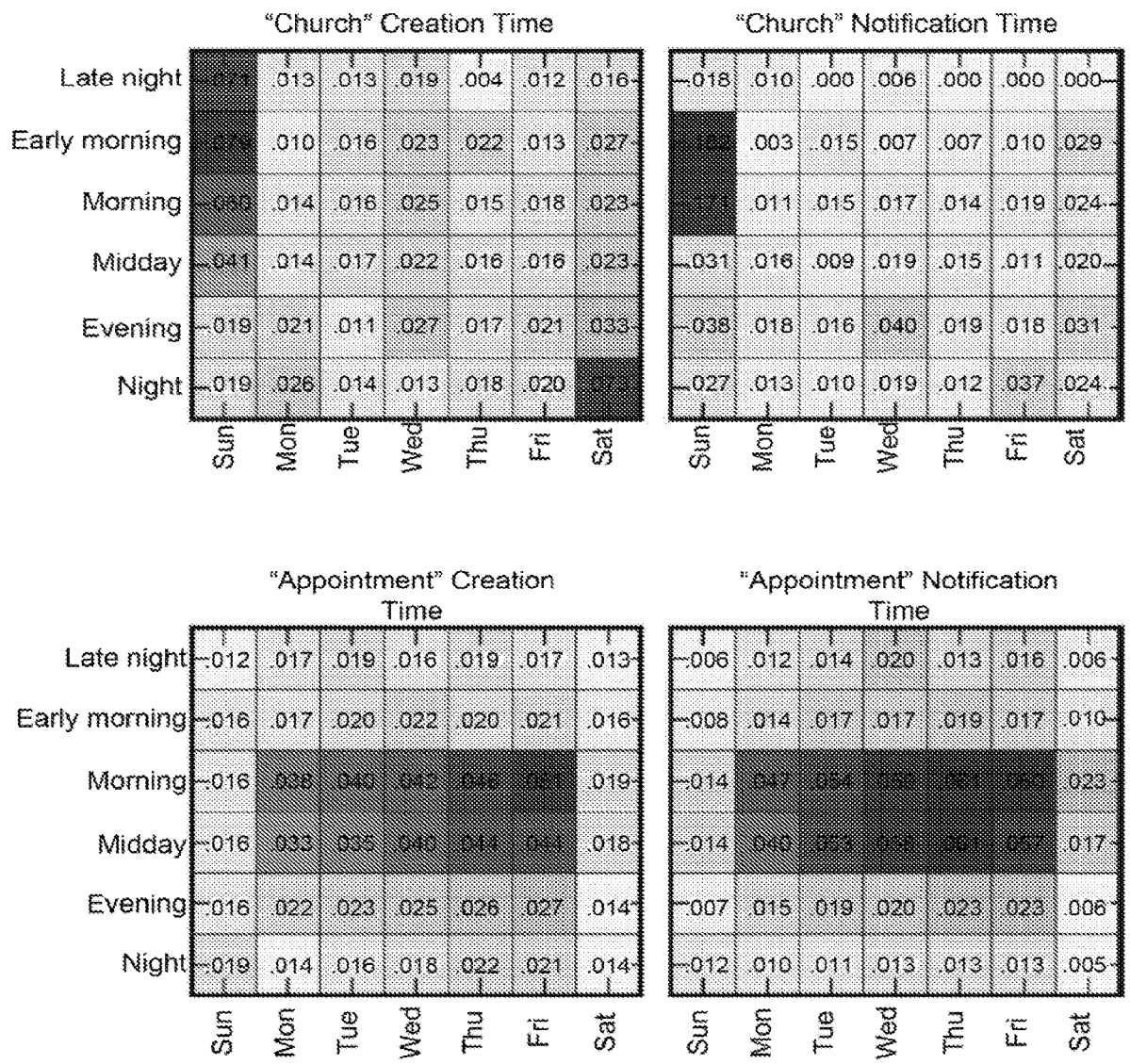
FIG. 8 shows an example of creation and notification times of task descriptions which contain the terms "church" or "appointment" based upon the example data according to an implementation disclosed herein.

FIG. 8 shows an example of creation and notification times of task descriptions which contain the terms "church" or "appointment" based upon the example data. The "appointment" plot shown in FIG. 8 indicates a strong pattern around the morning and midday blocks, representing office hours. Reminders that contain "church" show a clear pattern too in the example data; they tend to be largely created from Saturday night through Sunday morning, and tend to be set to notify on Sunday early morning and mornings.

Figure 9:
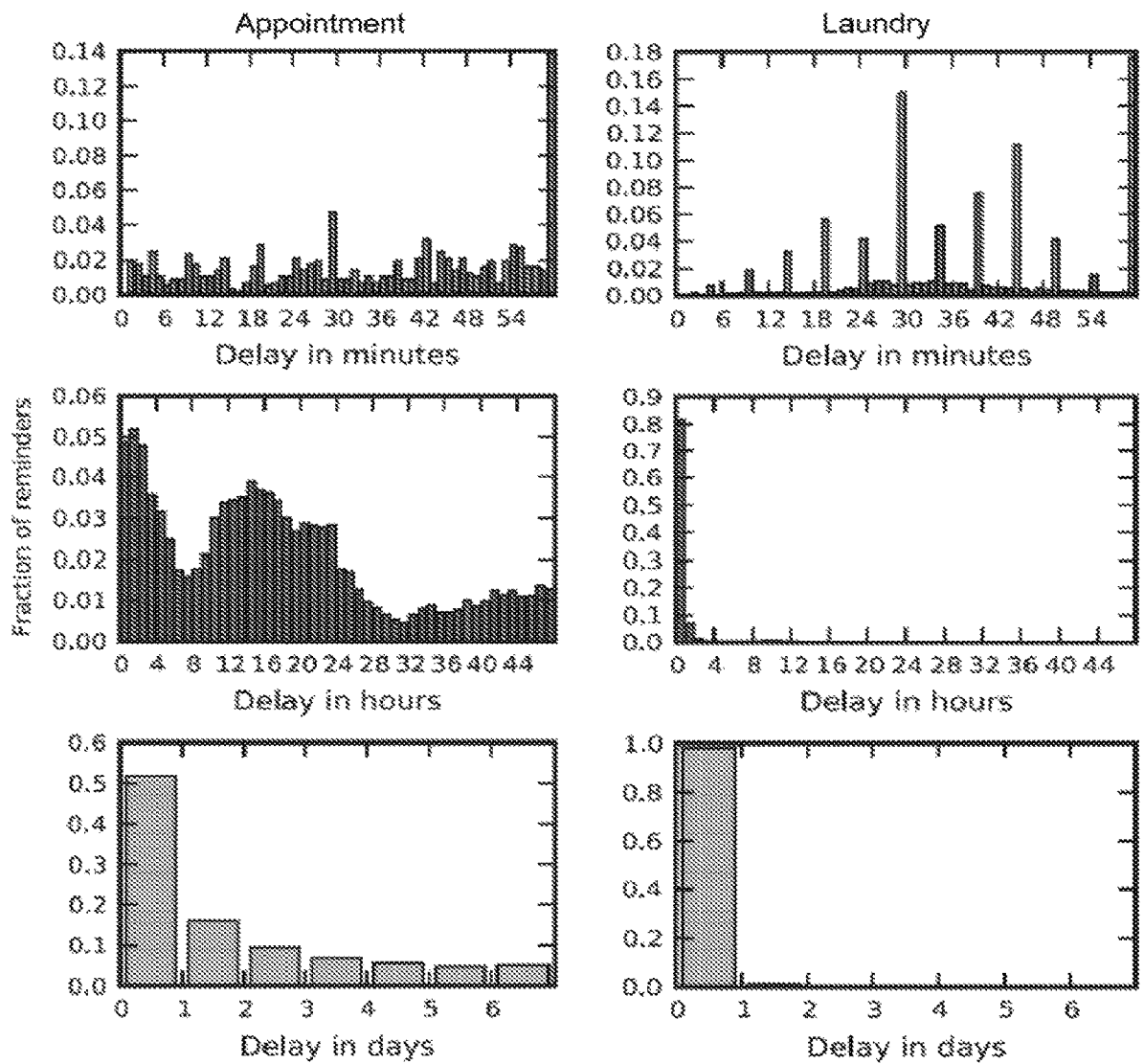
FIG. 9 illustrates an example of a comparison of the average delays of reminders containing the term "appointment" to "laundry" in the example data set.

FIG. 9 illustrates an example of a comparison of the average delays of reminders containing the term "appointment" to "laundry" in the example data set. On average, "appointment" reminders tended to have longer delays, reflected by the nature of the task (which may involve other individuals and hence require more planning), whereas "laundry" reminders tended to be more likely to reflect short-term tasks (which may be performed individually). Thus, distinct temporal patterns in task description terms can be observed.

Figure 10:
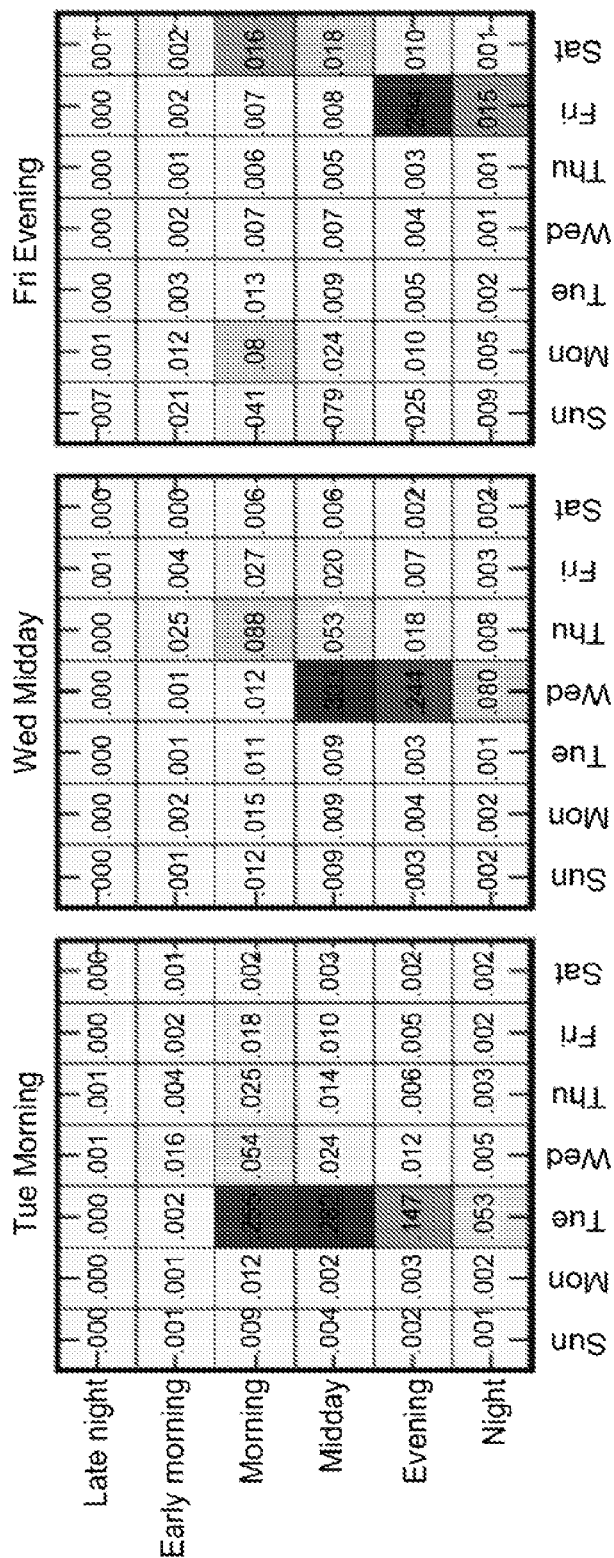
FIG. 10 shows examples of $P(r_{NT}|r_{CT})$ for three different $r_{CT}$ according to an implementation disclosed herein.

Correlations between reminder creation and notification time can be analyzed and/or determined. The probability of a reminder's notification time given its creation time, $P(r_{NT}|r_{CT})$, can be analyzed. FIG. 10 illustrates examples of probability distributions of a given reminder notification time given its creation time. The plots illustrated in FIG. 10 provide examples of how reminders across different creation times appear similar. For example, reminders tend to be most likely to have their notification trigger within the same cell or the next, confirming earlier observations on the example data that the majority of reminders are short-term (i.e., same cell). As the reminder's creation time moves towards later during the day, reminders tend to be more likely to be set to notify the next day. Furthermore, the plot for "Fri Evening" in FIG. 10 illustrates how reminders created on Friday evenings have a small but substantial probability of having their notification trigger on Monday morning (i.e., the reminder spans the weekend). These patterns show how delay between reminder creation and notification time tends to be low on average, but the length of delay may not be independent from the creation time.

The above analysis illustrates examples of temporal patterns in reminder creation and notification time of four types: aggregate patterns, task type-related, term-based, and time-based. Based on these observed patterns, a prediction task can be determined. Specifically, the day of the week in which a task is most likely to happen (i.e., predicting $r_{NT}$) can be predicted.

The task of predicting the day of week a reminder is set to notify can be set as multiclass classification, where each day of the week corresponds to a class. The input to the predictive model can be the reminder's task description ($r_{task}$), creation time ($r_{CT}$), and the target class is the notification time ($r_{NT}$) day of week. The predictive power of the patterns identified in the above analyses via term-based and (creation) time-based features can be measured. Specifically, for term-based features, a unigram bag of word features can be extracted, and time-based features may correspond to $R_{CT}$'s time of day (row) and day of week (column), and the minutes since the start of week.

Gradient Boosted Decision Trees, for example, may be utilized for classification. Other similar methods capable of large-scale learning may be employed. The Gradient Boosted Decision Trees, for example, can efficiently process non-linearity in the feature space and heterogeneous features. To address the multiclass nature of our problem, a one versus all classification strategy may be utilized in which, for example, seven binary classifiers may be trained, and the prediction with the highest confidence as final prediction may be output. The accuracy may be compared to randomly picking a day of the week (with accuracy of, for example, 1/7≈0.1429) and to a more competitive baseline which predicts the notification will be for the same day that the notification was created (BL-SameDay).

For the example analysis, six months of data are sampled from an automated personal assistant (e.g., from January through June 2015). All data were filtered according to the process described above, resulting in a total of 1,509,340 reminders. These data were split sequentially: the first 70% (approximately Jan. 1, 2015 to May 7, 2015) forms the training set, and the last 30% (approximately May 8, 2015 to Jun. 30, 2015) forms the test set. The first two months of the training set are used for the analysis described above as well as for parameter tuning before being retrained on the entire training set.

The predictive performance on the held out test set is described below. Specifically, macro and micro-averaged accuracy over the classes (Macro and Micro, respectively) is provided on the test data. Three systems are compared: one that leverages time features based on the reminder's creation time (Time only), one with term features (Terms only), and a model that leverages both types of features (Full model). Statistical significance is tested for using t-tests, comparing the predictive models against BL-SameDay. The symbols ▲ and ▼ denote statistically significant differences (greater than the baseline and worse than the baseline, respectively) at α=0.01.

Table 15 shows the results of the prediction task on the test data set. The baseline of predicting the notification time to be the same day as the creation time performs much better than random (at 0.1429). This indicates that users mostly set reminders to plan for events in the short-term in the test data. The "Time only" model significantly improves over the baseline, indicating that the reminder creation time helps further improve prediction accuracy. As noted earlier, tasks planned late at night tend to be more likely to be executed on a different day, and the use of creation time can help leverage this and more general patterns. The model that uses only features based on the task description (i.e., "Terms only") performs better than random, but does not outperform the baseline. However, when combined with the time model (i.e., "Full model") an increase of 8.2% relative to the "Time only" model is observed on the test data. From the foregoing analysis of the test data, it can be concluded that the creation time provides the most information for predicting when a task will be performed, the task description provides significant additional information, primarily when the description is used in combination with the reminder's creation time.

TABLE 15

| Run | Micro | Macro | Error reduction |
| --- | --- | --- | --- |
| Full model | 0.6788▲ | 0.6761▲ | +0.3381 |
| Time only | 0.6279▲ | 0.6258▲ | +0.2333 |
| Terms only | 0.1777▼ | 0.1772▼ | −0.6944 |
| BL-Sameday | 0.5147 | 0.5165 | |

Based on the above analyses, ITEs are commonly utilized in various user inputs (e.g., email). Furthermore, the frequencies of ITEs tend to follow a power-law distribution, with the most common expressions occurring exponentially more often than the least common expressions. An automated personal assistant, therefore, should be effective in resolving long-tail temporal expressions. Heuristics may be developed to resolve the most common ITEs, such as "next week," "this morning," "this afternoon," "this weekend," and "tomorrow morning." However, more complex temporal expressions (e.g., a little more than a week later, no later than tomorrow noon, around the end of this week or early next week, etc.) may present difficulties in extraction of ITEs and also for downstream interpretation and action (e.g., triggering reminders). The disclosed implementations provide a mechanism to predict at least one time interval even for these long-tail temporal expressions.

As previously indicated, ITEs can exhibit temporal periodicity. For example, "later this week" may occur most often on Mondays and Tuesdays, whereas "early next week" may occur most often on Fridays. Thus, a model may account for a temporal context of a user input to better predict at least one time interval to which the user input refers.

Figure 19:
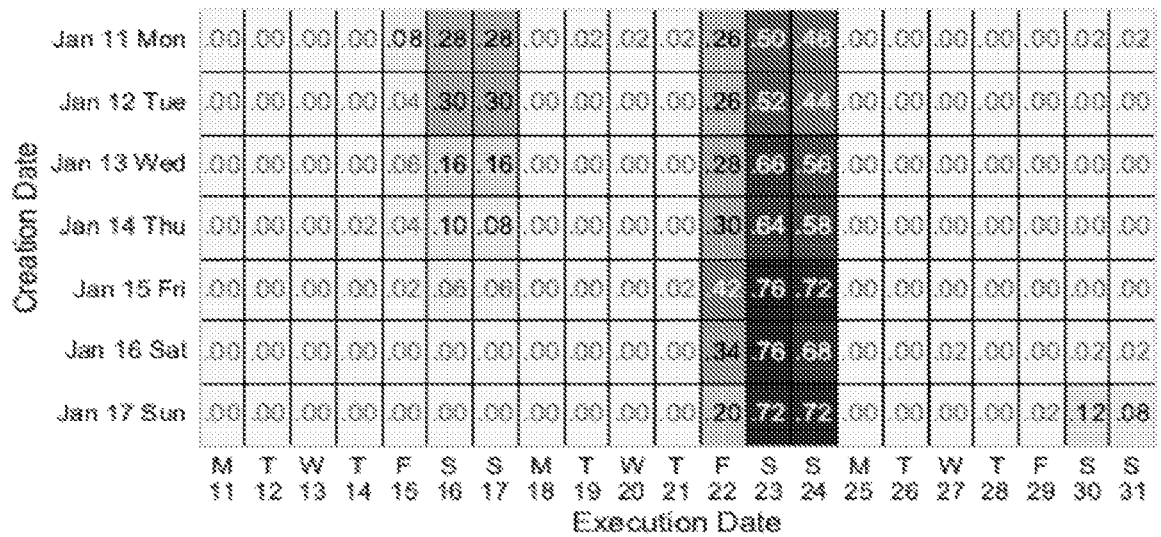
FIG. 19 illustrates an example of an interpretation of "next weekend" on different days of the week based on the crowdsourced results. The numbers shown are the proportion of users that include the particular execution date in their range of interpretation.
Figure 20:
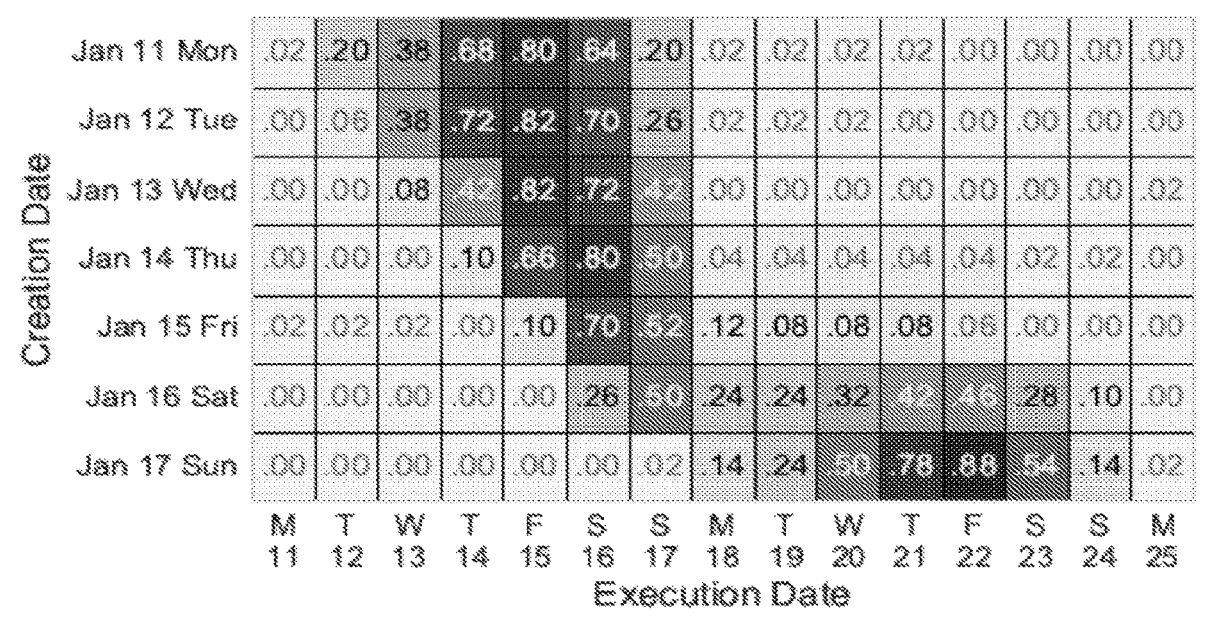

This was investigated by analyzing the times ascribed to ITEs in the example data set. It was observed that the interpretation of ITEs varies depending on the time in which it is considered. For example, when the given reference time is early in the work week, the interpretations of the phrase "next weekend" are characterized by a bimodal distribution (FIG. 19). Here, some interpret the phrase to mean the closest upcoming weekend, while others interpret the phrase to mean the weekend that concludes the following week. However, by Wednesday, much of the ambiguity is gone. Likewise, FIG. 20 summarizes the result obtained about the interpretation of "later this week." Agreeing with intuition, "later this week" tends to be most often interpreted to mean the remainder of the work week (ending Friday). The data also indicate that, from Monday to Wednesday, the interpreted distribution peaks on Friday. However, beginning on Thursday the peak in interpreted times shifts to Saturday. It may be that the users in the example data set their estimates because, beginning Thursday, the Friday is most naturally referred to as simply "tomorrow." These observed periodic regularities imply that date and time can be a crucial context for correctly interpreting ITEs. Based on the day of the week, the virtual assistant may adjust its expectations when getting an ITE as input from the user. For example, when the user says "later this week" on a Friday, which is a rare event according to its past occurrence frequencies, the system may verify with the user by asking what the user really means. Similarly, if the user says "next weekend" on a Monday, which is very ambiguous according to the interpretation model, the system may also actively verify with the user.

The foregoing description provides examples of how an imprecise temporal expression model can be generated and/or consumed by a device or service. The ITE model can be generated based upon logs obtained from an automated person assistant, an email corpus, or any other similar type of data set. The logs can be analyzed to determine time expressions of interest and identify imprecise temporal expressions such as those provided in the above tables. Based upon the identified imprecise temporal expressions, a probability distribution can be generated that indicates the time to which a given percentage of users believe or intend the imprecise temporal expression corresponds. As can be seen in the examples provided in FIGS. 1-10, these probability distributions can be represented in a variety of ways. Moreover, the manner by which the model is trained on a given data set can be modified using classification and/or regression analyses not specifically stated above. The model can be updated based upon a specific user's or specific group of users' preferences. For example, if a user is in a university setting (e.g., as identified by IP addresses), then the model may associate the term "morning" as referring to 11:00 AM, and not 8:00 AM. The processes performed to generate an ITE model can be performed or computer (e.g., Eqns. 1-3) by a processor of a client device and/or a server. Various configurations of a processor and client/server devices are described later with regard to FIGS. 15-16.

Figure 18A:
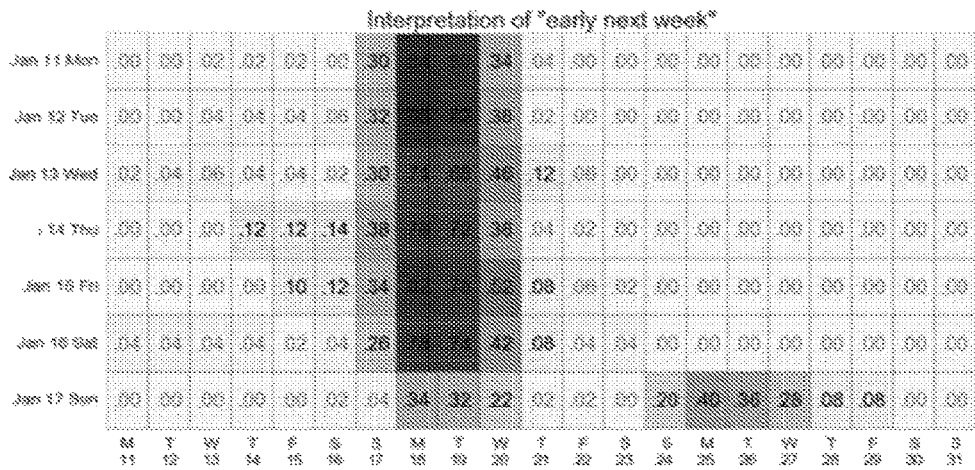
FIGS. 18A-C show examples of aggregated responses across multiple users (e.g., a group of users).
Figure 18B:
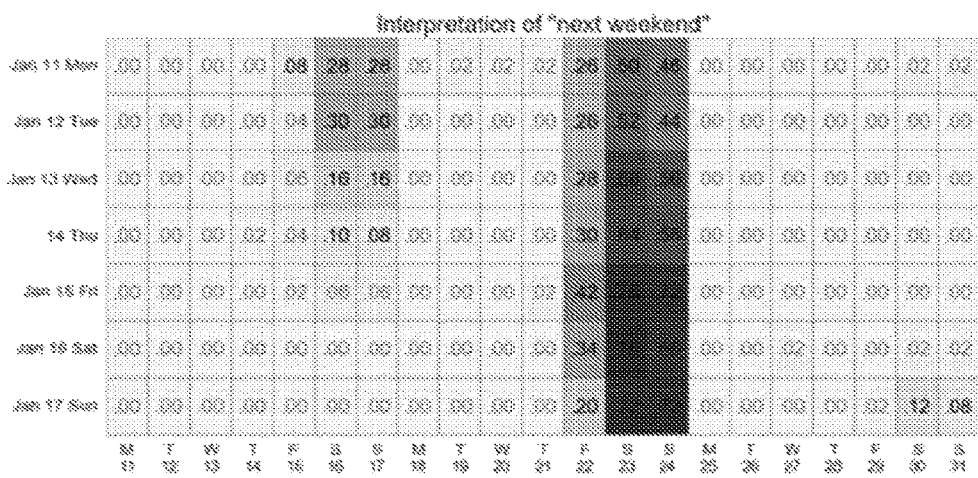
Figure 18C:
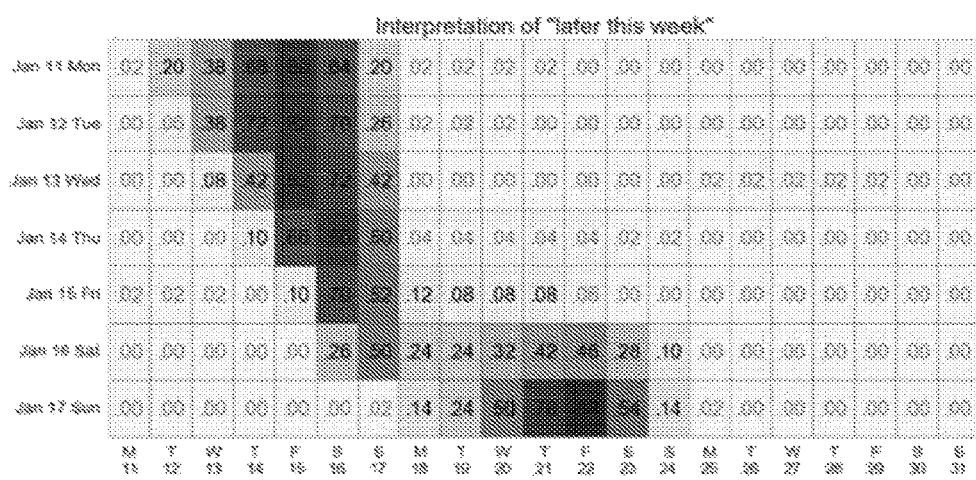

Similarly, a specific user may indicate that the user believes the term "morning" is 9:30 AM. For example, the user can indicate a specific time by answering a confirmation dialogue that presents a prediction of one or more times. FIG. 17 shows an example of a question that can be displayed to a user and that can receive a user's direct response to what the term "later this week or early next week" means to the user. FIGS. 18A-C show examples of aggregated responses across multiple users (e.g., a group of users). FIG. 18A shows an example distribution of responses for the term "early next week." FIG. 18B shows an example distribution of responses for the term "next weekend." FIG. 18C shows an example distribution of responses for the term "later this week." In FIGS. 18A-C. In FIGS. 18A-C, the x-axis represents a date of a user response, for example, to a question such as the one presented in FIG. 17, and the y-axis represents that time at which the response was made. As can be seen, for example, with "early next week," when the time of the user response is approximately Monday the 11th to Saturday the 16, most individuals believe the phrase pertains to an interval of time from approximately Monday the 18th to Wednesday the 20th. However, if the user response occurs on Sunday the 17th, the phrase "early next week" appears to have a bimodal distribution corresponding to approximately the 18th to the 20th and the 24th to the 27th. The prediction for "early next week," therefore, is an example of an ITE that can have a prediction of one or more time intervals that varies based upon the time of the text or utterance in which the ITE is detected. Thus, when the system detects an utterance or text that contains the phrase "early next week," it may generate a prediction based upon the time of the utterance or text, and the ITE model (e.g., FIG. 18A in this case).

As stated earlier, the ITE model can be updated based upon a group or specific user. In the event a user has not indicated a specific interval of time for a particular time, the aggregated responses from other users may be used to generate a prediction of an interval of time that corresponds to a particular user input (e.g., "next weekend"). Even if the user has indicated a time, the system may weight a particular distribution to reflect the user's preference, rather than return a discrete time value. An update to the model can proceed regardless of whether a client device is online or offline, and can proceed in batches or be updated in real time (e.g., with a persistent connection to the Internet or cloud service). An update, for example, may include additional ITEs that can be detected in user input and/or new/updated probability distributions.

Figure 11:
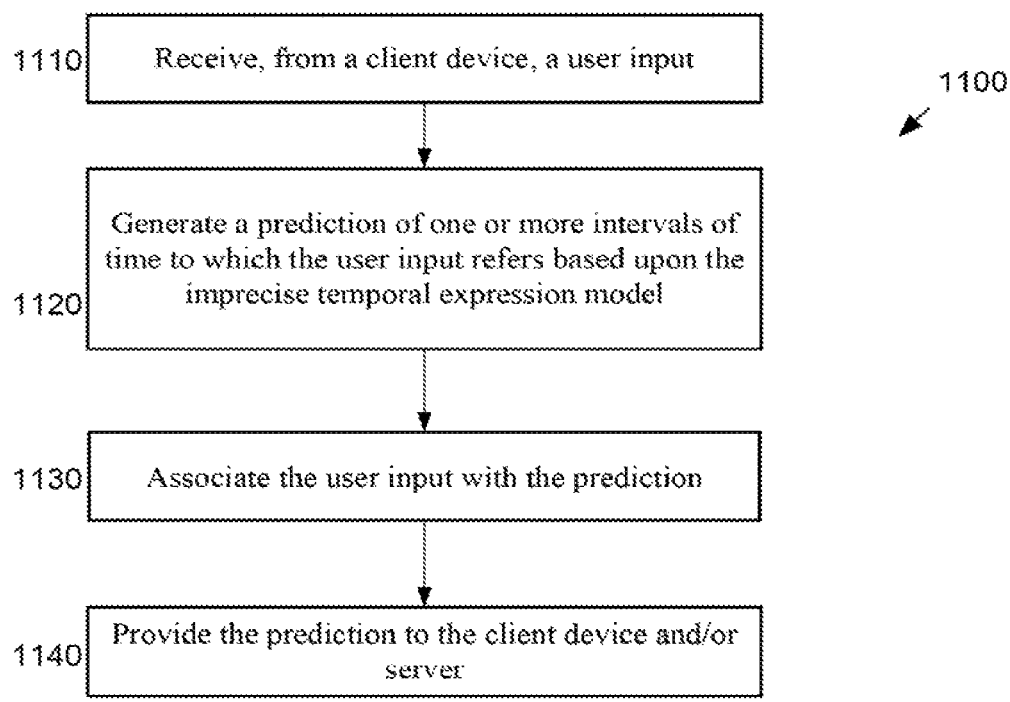
FIG. 11 shows an example of an implementation which provides a process for providing a prediction for an imprecise temporal expression to a client device (or other computer).

FIG. 11 shows an example of an implementation which provides a process for providing a prediction for an imprecise temporal expression 1100 to a client device (or other computer). At 1110, a user input from a client device may be received. The user input may correspond to a user's speech and/or a text input that is entered, detected, or received by a client device. For example, a user may issue a command such as "remind me to go to the store in the morning" or the user may author a note to schedule an appointment with an imprecise temporal expression (which the system may auto-complete as disclosed herein).

An ITE may be detected in the user's input. For example, the client device (e.g., laptop, smartphone, tablet, wearable device such as a smartwatch, server, etc.), device upon which an automated personal assistant is operating, and/or a server, may recognize one of the ITEs by comparing the user input to known time expressions or imprecise temporal expressions. As another example, the user input can be scanned for time expressions (e.g., weekend, afternoon, etc.) to detect the imprecise temporal expression. The user input can be filtered in some instances to remove words irrelevant to time expressions. As described earlier, candidate ITEs can be identified from existing datasets (e.g., interaction logs, a corpus of emails, etc.).

At 1120, a prediction can be generated of one or more intervals of time to which the user input refers based upon the ITE model. The user input can include at least one of an ITE, a contextual text, and/or a time of interaction. As described above, an ITE can be detected in the user input (e.g., "before next Monday" where the term Monday is a time expression that can be rendered imprecise by the preceding "before next"). Similarly, contextual text may refer to phrases that lack a specific ITE such as the phrase "mow the lawn," which is typically associated with an activity that occurs on the weekend. A time of interaction may refer to the example illustrated in FIGS. 17 and 18A-C, for example Notably, the user input may have a combination of these features such as "mow the lawn early next week" which may return a different prediction than simply "mow the lawn." Examples of a prediction have been described earlier. The prediction may be computed by a processor and/or stored in a database or the like on a client device and/or a server.

The ITE model can be generated based on an initial association of ITEs to one or more intervals of time and/or distributions as described earlier (e.g., via human-generated heuristics, crowdsourcing, etc.). An association of an ITE with an ITE model may refer to the particular ITE having a predicted interval of time. Such an association can be represented and/or utilized computationally in the form provided in Examples 1-14 earlier. Candidate ITEs may be enumerated from existing datasets (e.g., interaction logs, a corpus of email, etc.). An ITE may be detected utilizing, for example, a template matching process and/or a reformulation process. In a template matching method, common prefixes or suffixes for a set of known temporal entities can be determined (e.g., learning the term(s) surrounding "Monday" in a message such as "before Monday morning"). The discovered prefixes/suffixes can then be utilized to aid discovery of new temporal entities (e.g., "before _____ morning" can be detected to obtain "before tomorrow morning"). In a reformulation method, for example, reformulations to failed utterances to an automated personal assistant may be detected. For example, "will it rain on Halloween" may not be recognized by a conventional assistant. The user may reformulate the utterance to "will it rain on October 31st?" Both utterances begin with "will it rain on . . . " but the second utterance provides a precise date, thereby allowing the system to infer that October 31st corresponds to Halloween and that Halloween is a temporal entity. Other methods of extracting and identifying imprecise temporal expressions may be utilized according to the implementations disclosed herein. The extracted ITEs can be associated with one or more intervals of time and/or distributions over times and dates based upon human-generated heuristics, crowdsourcing, etc. For example, a survey of users can be conducted to ascertain how users interpret a particular imprecise temporal expression. Other phrases that can refer to an event or the like without an ITE (e.g., "mow the lawn") can also be ascertained utilizing the above-described techniques.

Returning to FIG. 11, the system can generate a prediction (e.g., a belief) based upon this mapping of when the imprecise temporal expression is likely to or will occur. For example, as shown in FIGS. 4 and 5, when the user input is to run an errand, the user is likely to be signaling that the user would like to perform this errand in the afternoon based upon the probability distributions for the example model. The system can select a specific time such as between 1:00 PM and 3:00 PM, corresponding to midday for this chore. The models may further reflect a time based probability distribution similar to FIGS. 4 and 5 to select a discrete time in that window. In some configurations, a user may have provided feedback to the model that indicates that user prefers tasks associated with "midday" to refer to 1:00 PM, in which case the system may select that time. Likewise, other imprecise temporal expressions like "early next week," "later this week," or "next weekend" can be resolved based upon the model. The distribution may vary based upon the context of a situation such as the time of day, current day, month, etc. For example, if a user indicates to the device to generate a reminder for next weekend and the current day is Saturday, the system may recognize that "weekend" refers to a time between 5:00 PM Friday and 5:00 PM Sunday, and that, given the current day, the user intends for the reminder to be made the following weekend.

The user input can be associated with the generated prediction at 1130. For example, if the user has requested an automated personal assistant schedule a chore for next weekend, a reminder may be generated for that chore to be surfaced (e.g., alert the user by tactile feedback, visual or auditory signal) on the client device of the user at or near the time of the prediction. For example, if a confidence in a prediction is low, the prediction on an ambient display such as the lock screen of a smartphone or a watch face of a smartwatch. The association of the prediction with the user input may refer to storing a time indication (e.g., at least one interval) along with the user input (e.g., a time and a task) and other data about the prediction (e.g., confidence in the prediction, time/date of the user input upon which the prediction is based), where the time indicates a triggering event for the task to be surfaced. As another example, a user may converse with a colleague on an instant messaging system or text messaging system. The user may convey that she would like to meet with the colleague this weekend. The personal assistant may determine, based upon the calendars of both the user and her colleague as well as the system's interpretation of the imprecise temporal expression "weekend," an appropriate time to select for a meeting.

Figure 12:
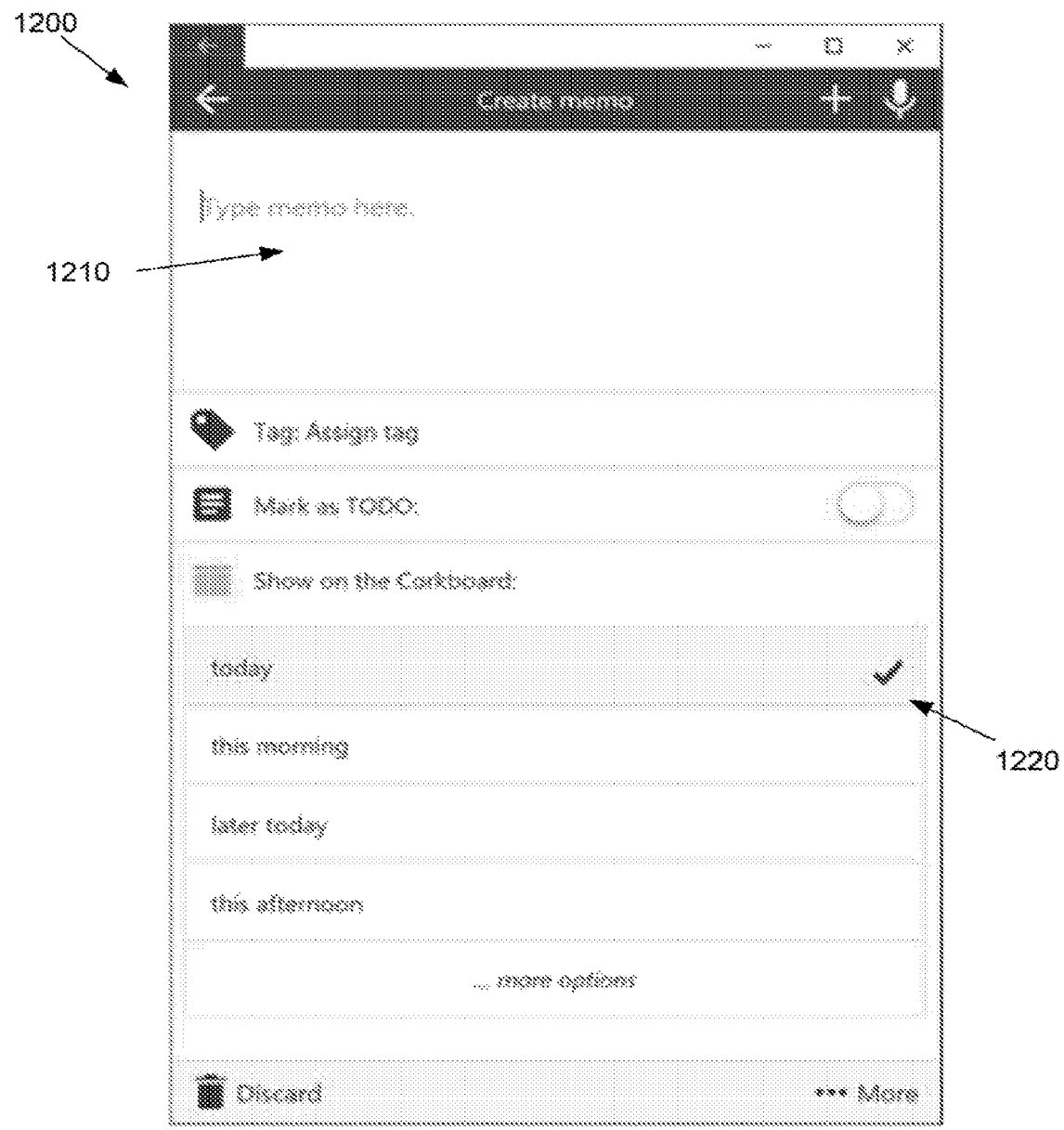
FIG. 12 illustrates an example interface of a note or memo program operating on a client device.
Figure 13:
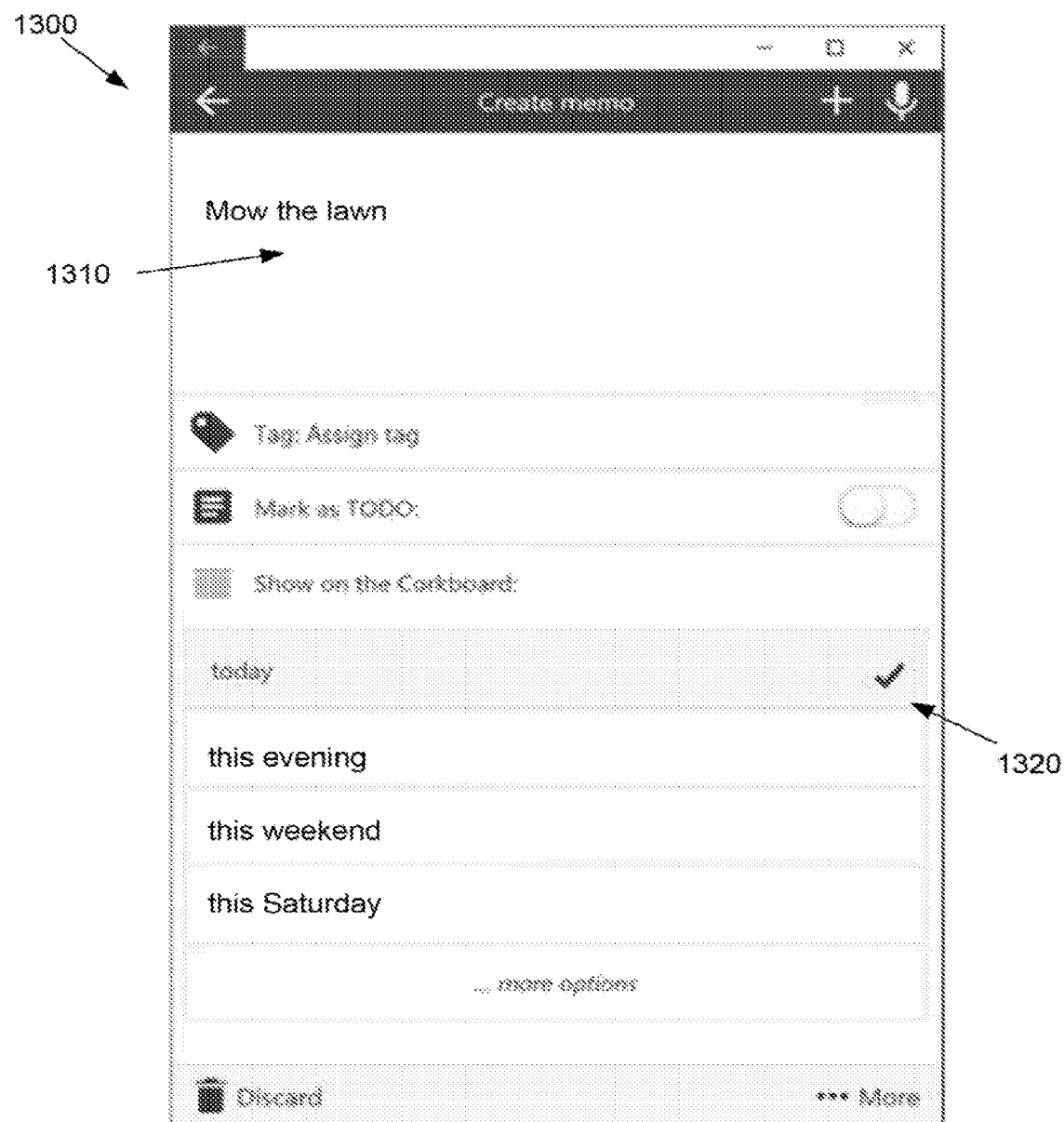
FIG. 13 is an example interface of the note or memo program operating on a client device in which text has been entered into the text entry box.

Finally, the process 1100 may include providing the prediction to the client device and/or server at 1140. The providing may refer to displaying an autocomplete selection, a timeline, a reminder at an appropriate time, a scheduling of an appointment, a time interval, a probability distribution, and other mechanisms of surfacing the prediction. As described earlier, the client device and/or server may provide the prediction to other applications that utilize the prediction for services not immediately exposed to the user (e.g., the prediction is a time interval provided to a scheduling application). FIG. 12 illustrates an example interface 1200 of a note or memo program operating on a client device. As can be seen, the text input box 1210 does not have any text entered into it. Based on the time of day, day of week, etc., the system can predict what imprecise temporal expressions a user may want to use. Selecting an autocompletion 1220 can save the user from typing full expressions. For example, the list may suggest "this weekend" when it is a Friday, "early tomorrow" when it is the evening, or "later today" when it is the morning, and so on. FIG. 13 is an example interface 1300 of the note or memo program operating on a client device in which text has been entered into the text entry box 1310. Based on the user's input, the suggestions 1320 can be updated accordingly. In this example, mowing the lawn can be identified as a type of "chore" and something that is likely done on evenings or weekends. Thus, FIGS. 12 and 13 can be examples of how the process illustrated in FIG. 11 can provide a prediction.

In some instances, a series of predictions may be presented to a user and the system may generate a request to receive a user input to confirm the prediction such as in FIG. 13. In some instances, a user may modify the prediction by selecting a different time or issuing a correction to the time prediction. The system may adjust the initial imprecise temporal expression model to reflect that the particular user believes the imprecise temporal expression to correspond to a different discrete or range of time. For example, the probability distribution may be weighted such that the user's indicated time is the one associated with the imprecise expression. As another example, a ranked list can be reordered based upon a user's indication of what the user belies the ITE to correspond to. The list can be presented to the user on the display of a client device. The list may be color coded to convey the likely that a user will want or need the information at a given time based upon the ITE model. The disclosed implementations may predict if/when a user may wish to receive information and present the information via an appropriate means given the urgency and uncertainty of the information (e.g., updating an ambient display, send a notification, etc.). The prediction may be displayed to a user in myriad of ways, and is not limited to the specific examples illustrated in FIGS. 12-14. In addition, the ITE model may be updated in a variety of ways other than those explicitly described herein.

Figure 14:
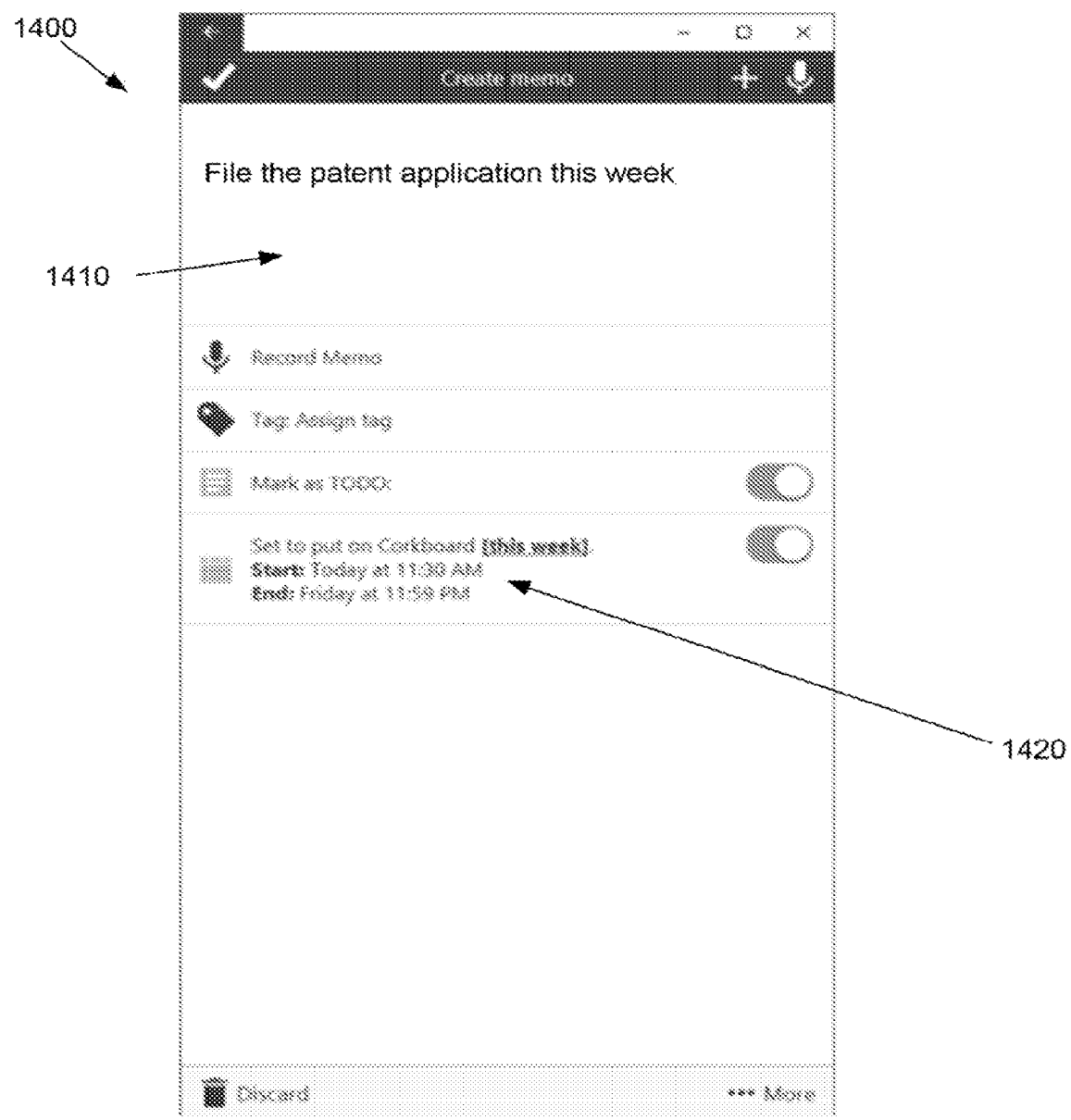
FIG. 14 is an example interface for a note or memo program operating on a client device in which a user has entered into the text input box the phrase "file the patent application this week."

FIG. 14 is an example interface 1400 for a note or memo program operating on a client device in which a user has entered into the text input box 1410 the phrase "file the patent application this week." The term "this week" may be detected as an imprecise temporal expression. The system's interpretation (e.g., prediction) of the imprecise temporal expression may be provided as shown at 1420. The prediction, for example, may be based on a 95% confidence interval (upper and lower bounds) of the interpretation of "next week." Furthermore, the prediction can be added to, for example, a user's calendar and/or task list automatically. Thus, the prediction can be provided (e.g., surfaced) at an appropriate time. In some instances, the prediction may be displayed to a user on the client device at a time corresponding to the user input (e.g., "in the morning" may be displayed the following morning at 9:00 AM).

Figure 21:
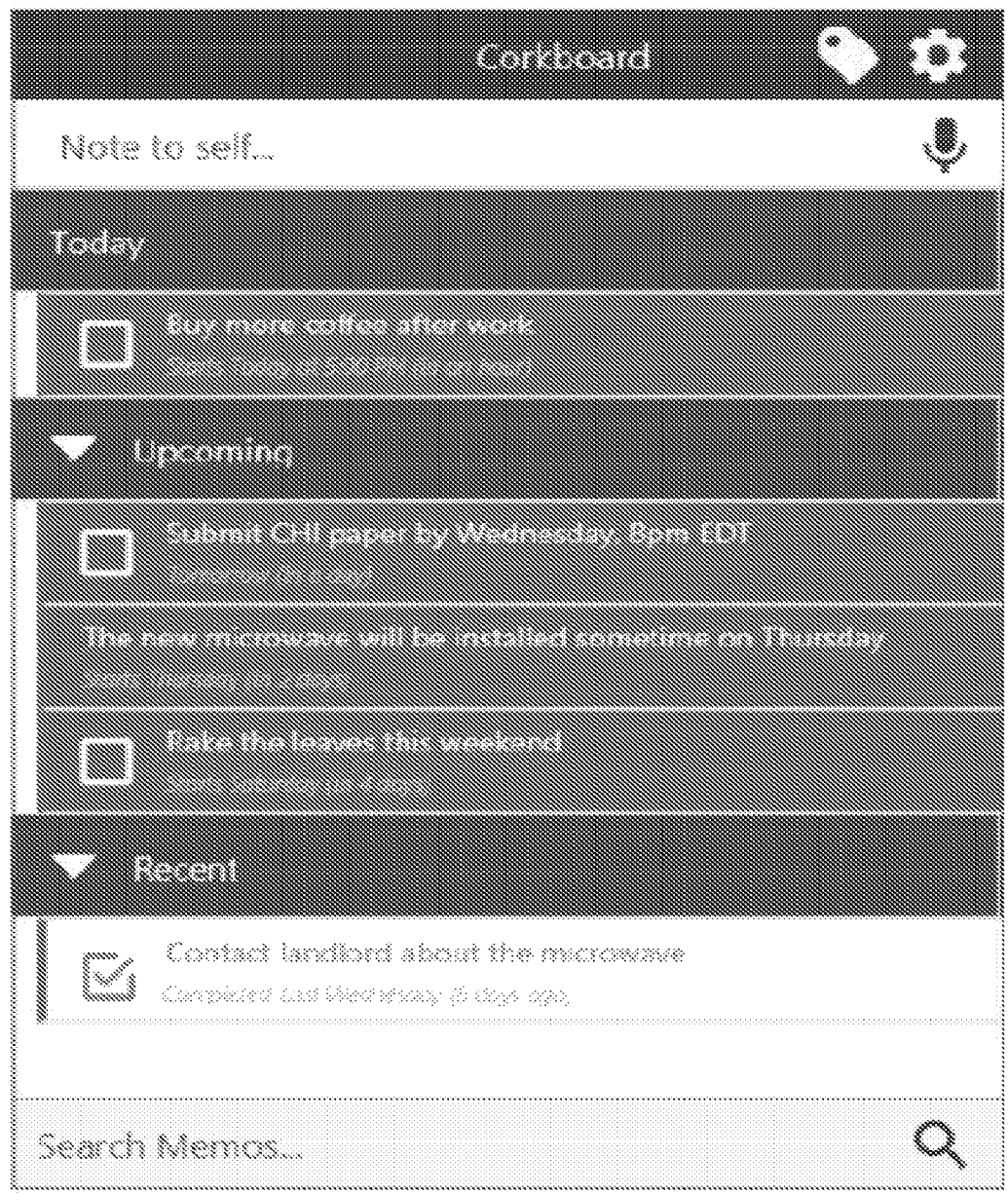
FIG. 21 is an example of an automated personal assistant's note or memo application displaying an ordered list of tasks based upon various predictions generated from user input according to an implementation disclosed herein.

FIG. 21 is an example of an automated personal assistant's note or memo application displaying an ordered list of tasks based upon various predictions generated from user input according to an implementation disclosed herein. The automated personal assistant may be programmed to recognize a broad range of ITEs as described earlier. When creating an item for the application illustrated in FIG. 21, users may specify a time period. A short list of items may be displayed relevant to a given moment in time as shown in FIG. 21. For example, a user could specify that time are displayed by including temporal expressions in the text of an item such as "get coffee after work" by selecting among a list of common expressions (e.g., "today", "tomorrow", etc.), or by picking a specific date or time from a calendar or time picker widget.

Figure 22:
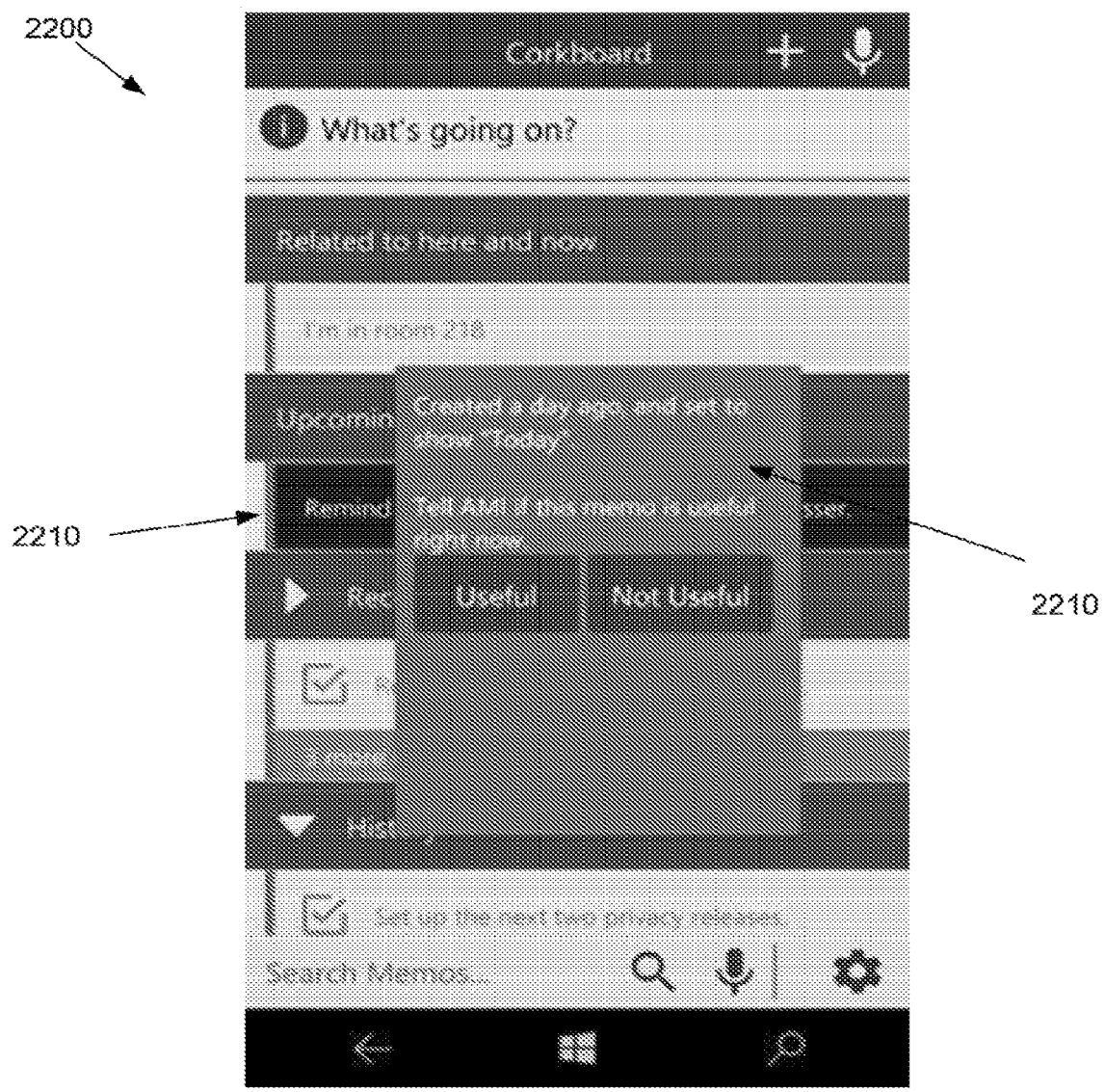
FIG. 22 is an example of explicit feedback that can be provided by a user.

A user's feedback may implicit or explicit. For example, in FIG. 14, if the user manually corrects the start and/or end time, it can be utilized as training data to improve the model for the input string of "the week." Such feedback is an example of implicit feedback (e.g., taking or not taking corrective actions). Other forms of implicit feedback may be similarly utilized to update an ITE model. FIG. 22 is an example of explicit feedback that can be provided by a user. For example, a user may click and hold on an item 2210 in the display 2200. This may cause a dialogue box 2220 to appear and enable the user to provide explicit feedback to the system. Other forms of explicit feedback can be likewise received, for example, clicking a "thumbs up," ignoring a notification, swiping a notification a particular direction, a gesture, etc. The feedback can be aggregated across multiple users to update an ITE model.

In an implementation, a system that includes a database for storing the imprecise temporal expression model and a processor communicatively coupled thereto. The database and processor configuration are described in further detail below with regard to FIGS. 15 and 16. The database may refer to a local storage of a device, a memory, a server or cloud based database, etc. The imprecise temporal expression model may be compressed to accommodate the reduced amount of storage available in certain devices such as a wearable device. The processor may be configured, for example, to perform the processes illustrated in FIG. 11.

In an implementation is disclosed that includes a non-transitory computer readable medium having stored thereon computer readable instructions that are executable to cause one or more processors to perform operations. The operations may be similar to those described above with regard to FIG. 11.

Figure 15:
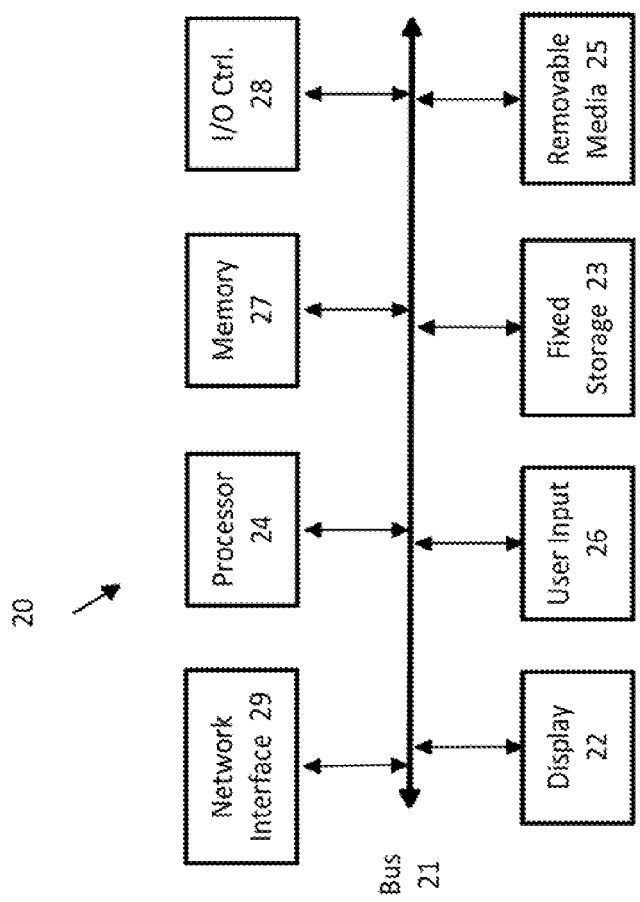
FIG. 15 is an example computer suitable for implementing embodiments of the presently disclosed subject matter.

Embodiments of the presently disclosed subject matter may be implemented in and used with a variety of component and network architectures. FIG. 15 is an example computer 20 (e.g., electronic device such as a smartphone, tablet, laptop, personal computer, wearable device such as a smartwatch, server, etc.) suitable for implementing embodiments of the presently disclosed subject matter. The client device as described above may be a computer 20. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 15 need not be present to practice the present disclosure. The components can be interconnected in different ways from that shown. The operation of a computer such as that shown in FIG. 15 is readily known in the art and is not discussed in detail in this application. Code to implement the present disclosure can be stored in computer-readable storage media such as one or more of the memory 27, fixed storage 23, removable media 25, or on a remote storage location.

Figure 16:
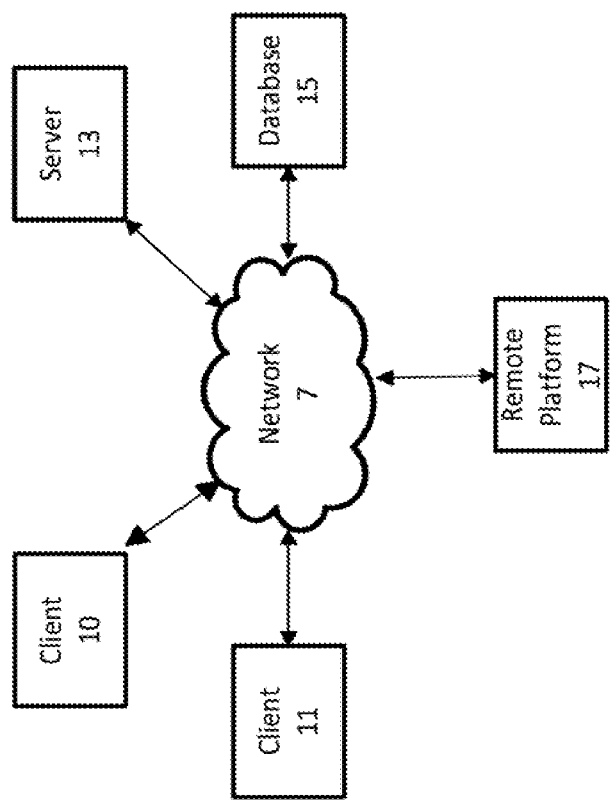
FIG. 16 shows an example network arrangement according to an embodiment of the disclosed subject matter.

FIG. 16 shows an example network arrangement according to an embodiment of the disclosed subject matter. One or more clients 10, 11, such as local computers, smartphones, wearable devices, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
    a memory for storing an imprecise temporal expression model, wherein the imprecise temporal expression model is trained using one or both of classification analysis and regression analysis to indicate times an imprecise temporal expression corresponds based on a type of activity associated with the imprecise temporal expression; and
    a processor communicatively coupled to the memory, and configured to:
        receive a user input;
        generate a prediction of one or more intervals of time to which the user input refers based upon the imprecise temporal expression model in the memory, wherein the user input comprises of an imprecise temporal element, a type of activity associated with the imprecise temporal expression, and a time of interaction;
        associate the user input with the prediction; and
        provide the prediction in response to the user input.

2. The system of claim 1, the processor further configured to display the prediction at a time corresponding to the user input.

3. The system of claim 1, the processor further configured to:
    present the prediction; and
    generate a request to receive a second user input to confirm the prediction.

4. The system of claim 3, the processor further configured to:
    receive an indication to modify the prediction; and
    update the imprecise temporal expression model in the memory based upon the indication.

5. The system of claim 1, wherein the user input is received in a form selected from the group consisting of a voice input and a text input.

6. The system of claim 1, wherein providing the prediction in response to the user input includes providing one or more of: a reminder, a notification, an auto-completion of text, a timeline, a task list, a calendar scheduling, a time interval, a ranked list of time intervals, and a probability distribution.

7. The system of claim 1, the processor further configured to generate the imprecise temporal expression model.

8. The system of claim 1, the processor further configured to detect an imprecise temporal expression in the user input.

9. A method, comprising:
    receiving, at a client device, a user input;
    generating, on the client device a prediction of one or more intervals of time to which the user input refers based upon an imprecise temporal expression model, wherein the user input comprises at least one of an imprecise temporal element, a type of activity associated with the imprecise temporal expression, and a time of interaction, and wherein the imprecise temporal expression model is trained using one or both of classification analysis and regression analysis to indicate times an imprecise temporal expression corresponds based on a type of activity associated with the imprecise temporal expression;
    associating the user input with the prediction; and
    providing the prediction.

10. The method of claim 9, further comprising displaying the prediction on the client device at a time corresponding to the user input.

11. The method of claim 9, further comprising:
presenting the prediction on the client device; and
generating a request to receive a second user input to confirm the prediction.

12. The method of claim 11, further comprising:
receiving an indication to modify the prediction; and
updating the imprecise temporal expression model in a memory of the client device based upon the indication.

13. The method of claim 9, wherein the user input is received in a form selected from the group consisting of a voice input and a text input.

14. The method of claim 9, wherein providing the prediction in response to the user input includes providing one or more of: a reminder, a notification, an auto-completion of text, a timeline, a task list, a calendar scheduling, a time interval, a ranked list of time intervals, and a probability distribution.

15. The method of claim 9, further comprising generating the imprecise temporal expression model.

16. The method of claim 9, further comprising detecting the imprecise temporal element in the user input.

17. A non-transitory computer readable medium having stored thereon computer readable instructions that are executable to cause one or more processors to perform operations, comprising:
receiving, at a client device, a user input;
generating, on the client device, a prediction of one or more intervals of time to which the user input refers based upon an imprecise temporal expression model, wherein the user input comprises an imprecise temporal element, a type of activity associated with the imprecise temporal expression, and a time of interaction, and wherein the imprecise temporal expression model is trained using one or both of classification analysis and regression analysis to indicate times an imprecise temporal expression corresponds based on a type of activity associated with the imprecise temporal expression;
associating the user input with the prediction; and
providing the prediction.

18. The non-transitory computer readable medium of claim 17, the processor further configured to perform the operation comprising displaying the prediction on the client device at a time corresponding to the user input.

19. The non-transitory computer readable medium of claim 17, the processor further configured to perform the operations comprising:
presenting the prediction on the client device; and
generating a request to receive a second user input to confirm the prediction.

20. The non-transitory computer readable medium of claim 17, the processor further configured to perform the operations comprising detecting an imprecise temporal expression in the user input.

* * * * *